United States Patent
Tanaka et al.

(10) Patent No.: US 6,282,323 B1
(45) Date of Patent: *Aug. 28, 2001

(54) IMAGE PROCESSING METHOD AND APPARATUS

(75) Inventors: Mamoru Tanaka, Tokyo; Hiroshi Inoue, Yokohama; Masaaki Imaizumi, Tokyo; Toshiaki Shingu, Kawasaki; Masamichi Ohshima, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,309

(22) Filed: Dec. 4, 1997

(30) Foreign Application Priority Data

Dec. 4, 1996 (JP) .................................................. 8-324046

(51) Int. Cl.$^7$ ...................................................... G06K 9/46
(52) U.S. Cl. .......................... 382/251; 382/156; 382/253; 358/1.9; 358/456
(58) Field of Search ................................... 382/251, 252, 382/156, 158, 253, 270, 176, 205, 233; 358/465, 466, 1.9, 500, 455, 456, 443, 447, 457; 347/251; 714/704; 706/29, 16, 15

(56) References Cited

U.S. PATENT DOCUMENTS

| | | | |
|---|---|---|---|
| 5,488,673 | * 1/1996 | Katayama et al. | 382/270 |
| 5,608,821 | * 3/1997 | Metcalfe et al. | 382/252 |
| 5,621,542 | * 4/1997 | Ohta et al. | 358/455 |
| 5,638,190 | * 6/1997 | Geist | 358/500 |
| 5,721,544 | * 2/1998 | Suzuki | 341/50 |
| 5,724,090 | 3/1998 | Tanaka et al. | 347/251 |
| 5,768,438 | * 6/1998 | Etoh | 382/251 |
| 5,805,738 | * 9/1998 | Kaburagi et al. | 382/251 |
| 5,841,904 | * 11/1998 | Sugiura | 382/233 |
| 5,867,593 | * 2/1999 | Fukuda et al. | 382/176 |
| 5,931,960 | * 8/1999 | Kletter | 714/704 |
| 5,940,541 | * 8/1999 | Donelly | 382/252 |
| 6,148,101 | * 11/2000 | Tanaka et al. | 382/156 |

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

In an image processing method and apparatus, image data having multi-value levels for one pixel is input, and the input image data is quantized such that an output area of one pixel is adapted to an output device in which an output area of one pixel changes depending on the position of the pixel. A quantizing process executes an arithmetic operation based on an algorithm of a neural network on the basis of a value obtained by multiplying an output value by a weight corresponding to an area of each pixel. Therefore, even if pixels have different maximum luminances, the different numbers of bits, and different color expression capabilities, an optimum half-tone process can be performed by an algorithm based on a cellular neural network, and a high-quality image can be obtained.

8 Claims, 21 Drawing Sheets

| LUMINANCE | e | b | k | h | q | n |
|---|---|---|---|---|---|---|
| 0 | | | | | | |
| 1 | | | | O | | |
| 1.5 | | | | | | O |
| 2 | | | O | | | |
| 2.5 | | O | | | | |
| 3 | | | O | O | | |
| 3.5 | | | O | | | O |
| 4 | | O | | | | O |
| 4.5 | | | | | O | O |
| 5 | | O | | O | | O |
| 5.5 | | | | O | O | O |
| 6 | | O | O | | | O |
| 6.5 | | | O | | O | O |
| 7 | | O | O | O | | O |
| 7.5 | | | O | O | O | O |
| 8 | O | | | | O | |
| 8.5 | O | O | | O | | |
| 9 | O | | | O | O | |
| 9.5 | O | O | O | | | |
| 10 | O | | O | | O | |
| 10.5 | O | O | | | O | |
| 11 | O | | O | O | O | |
| 11.5 | O | O | O | | O | |
| 12 | O | O | | | O | O |
| 12.5 | O | | O | O | O | O |
| 13 | O | O | | O | O | O |
| 13.5 | O | O | O | O | O | |
| 14 | O | O | O | | O | O |
| 15 | O | O | O | O | O | O |

| LUMINANCE | c | f | i | l | o | r |
|---|---|---|---|---|---|---|
| 0 | | | | | | |
| 1 | | | | O | | |
| 1.5 | | | | | | O |
| 2 | | | O | | | |
| 2.5 | | O | | | | |
| 3 | | | O | O | | |
| 3.5 | | | O | | | O |
| 4 | | O | | | | O |
| 4.5 | | | | | O | O |
| 5 | | O | | O | | O |
| 5.5 | | | | O | O | O |
| 6 | | O | O | | | O |
| 6.5 | | | O | | O | O |
| 7 | | O | O | O | | O |
| 7.5 | | | O | O | O | O |
| 8 | O | | | | O | |
| 8.5 | O | O | | O | | |
| 9 | O | | | O | O | |
| 9.5 | O | O | O | | | |
| 10 | O | | O | | O | |
| 10.5 | O | O | | | O | |
| 11 | O | | O | O | O | |
| 11.5 | O | O | O | | O | |
| 12 | O | O | | | O | O |
| 12.5 | O | | O | O | O | O |
| 13 | O | O | | O | O | O |
| 13.5 | O | O | O | O | O | |
| 14 | O | O | O | | O | O |
| 15 | O | O | O | O | O | O |

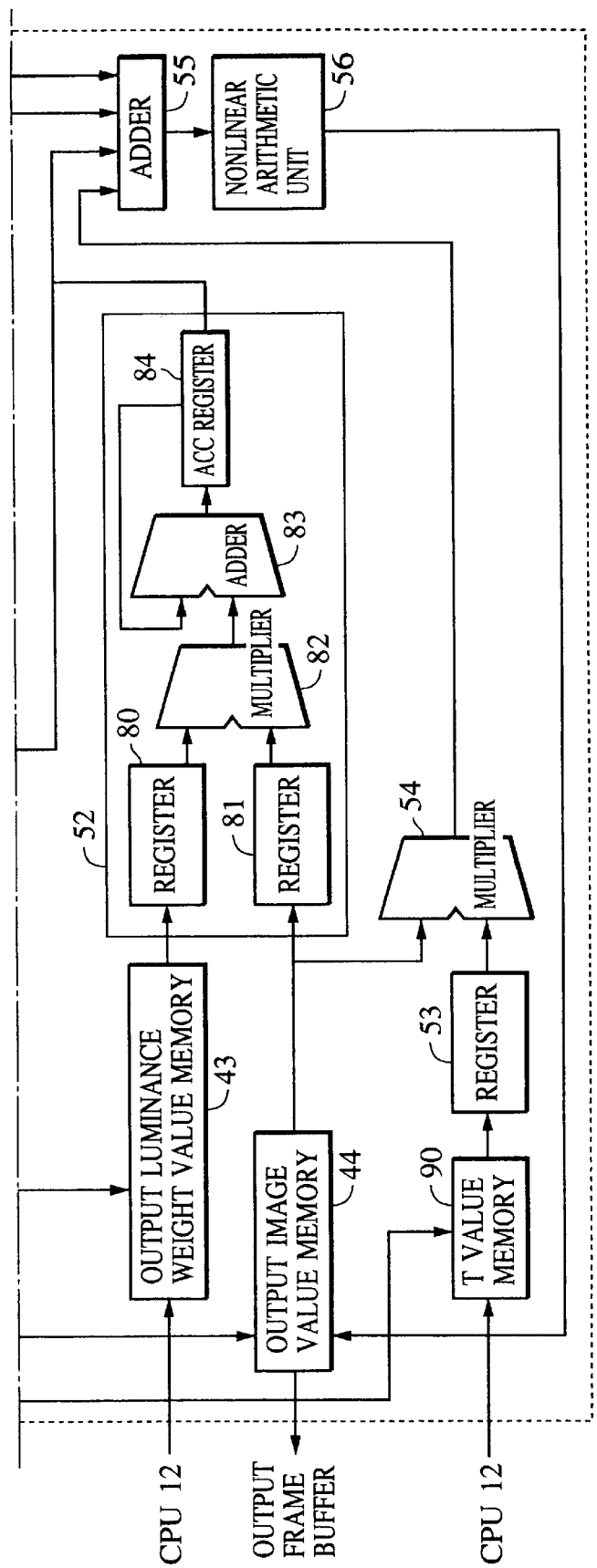

FIG. 19

| INPUT OF SUB-PIXEL PATTERN TABLE | OUTPUT OF SUB-PIXEL PATTERN TABLE | | | | | |
|---|---|---|---|---|---|---|
| z | a | b | c | d | e | f |
| $z < 0.5$ | | | | | | |
| $0.5 \leq z < 1.25$ | | | | ○ | | |
| $1.25 \leq z < 1.75$ | | | | | | ○ |
| $1.75 \leq z < 2.25$ | | | ○ | | | |
| $2.25 \leq z < 2.75$ | | ○ | | | | |
| $2.75 \leq z < 3.25$ | | | ○ | ○ | | |
| $3.25 \leq z < 3.75$ | | | ○ | | | ○ |
| $3.75 \leq z < 4.25$ | | ○ | | | | ○ |
| $4.25 \leq z < 4.75$ | | | | | ○ | ○ |
| $4.75 \leq z < 5.25$ | | ○ | | ○ | ○ | ○ |
| $5.25 \leq z < 5.75$ | | | | ○ | ○ | ○ |
| $5.75 \leq z < 6.25$ | | ○ | ○ | | | ○ |
| $6.25 \leq z < 6.75$ | | | ○ | | ○ | ○ |
| $6.75 \leq z < 7.25$ | | ○ | ○ | ○ | | ○ |
| $7.25 \leq z < 7.75$ | | | ○ | ○ | ○ | ○ |
| $7.75 \leq z < 8.25$ | ○ | | | | ○ | |
| $8.25 \leq z < 8.75$ | ○ | ○ | | ○ | | |
| $8.75 \leq z < 9.25$ | ○ | | | ○ | ○ | |
| $9.25 \leq z < 9.75$ | ○ | ○ | ○ | | | |
| $9.75 \leq z < 10.25$ | ○ | | ○ | | ○ | |
| $10.25 \leq z < 10.75$ | ○ | ○ | | | ○ | |
| $10.75 \leq z < 11.25$ | ○ | | ○ | ○ | ○ | |
| $11.25 \leq z < 11.75$ | ○ | ○ | ○ | | ○ | |
| $11.75 \leq z < 12.25$ | ○ | ○ | | | ○ | ○ |
| $12.25 \leq z < 12.75$ | ○ | | ○ | ○ | ○ | ○ |
| $12.75 \leq z < 13.25$ | ○ | ○ | | ○ | ○ | ○ |
| $13.25 \leq z < 13.75$ | ○ | ○ | ○ | ○ | ○ | |
| $13.75 \leq z < 14.5$ | ○ | ○ | ○ | | ○ | ○ |
| $14.5 \leq z$ | ○ | ○ | ○ | ○ | ○ | ○ |

IMAGE PROCESSING METHOD AND APPARATUS

BACKGROUND OF THE INVENTION

1. Field of the Invention

The present invention relates to an image processing method and apparatus for quantizing input image data into data having levels which are smaller in number than input levels of the input image data and, more particularly, to an image processing method and apparatus for performing a quantizing process such that image data is adapted to an output device in which an output area of one pixel changes depending on the position of the pixel.

2. Description of the Related Art

In order to reproduce a variable-density image by a printer or a display which performs a binary display by black and white, an area gradation method which expresses the variable-density image by forming a pseudo digital half-tone image has been conventionally used. The area gradation method is a method for changing the ratio of black in a neighborhood image to reproduce a gradation image. As this method, a dither method in which a variable-density image u(x,y) of an original image is compared with a threshold value T calculated by a predetermined rule or an error diffusion method in which an error between an input variable-density image value and an output half-tone image is diffused to a pixel which is not scanned is practically used.

In a color image, the following technique is conventionally known. That is, an input color image is subjected to a half-tone process by using the dither method or the error diffusion method to obtain low-bit data (e.g., 1-bit binary data), and a full-color image is formed by using a binary printer and a binary display device.

However, the conventional dither method or the conventional error diffusion method is designed on the assumption that an output device has the same gradation expression capability for all pixels (all the pixels have the same maximum luminance, the same number of bits, and the same color expression capability). For this reason, each of these method has a drawback that an output device which has different maximum luminances, the different numbers of bits, and different color expression capabilities for respective pixels cannot be used. In addition, in a device such as a liquid-crystal display in which the number of pixels is fixed, when the number of pixels of display data and the number of pixels of the device are different from each other, a half-tone process must be performed after resolution conversion is performed by an interpolation process.

SUMMARY OF THE INVENTION

The present invention has been made to remove the drawback of the prior art, and has as its object to provide an image processing method and apparatus in which quantized data (data subjected to a half-tone process) to be output to an output device which has different maximum luminances, the different number of bits, different color expression capabilities, and different resolutions for respective pixels on the basis of input multi-value image data.

It is another object of the present invention to provide an image processing method and apparatus which can perform an optimum half-tone process by an algorithm based on a cellular neural network even if pixels have different maximum luminances, the different numbers of bits, and different color expression capabilities and can obtain a high-quality image.

It is still another object of the present invention to provide an image processing method and apparatus which can perform a half-tone process in a standard resolution mode and a high-resolution mote by updating a table and the value of a memory in the same hardware.

It is still another object of the present invention to provide an image processing method and apparatus in which an arithmetic operation for a sum of products required for a half-tone process can be performed by only an addition such that data is divided for respective sub-pixels to store the divided data in a memory in advance, and a process speed can be made high.

The above object and other objects will be apparent from the detailed description based on the following drawings.

BRIEF DESCRIPTION OF THE DRAWINGS

FIG. 19 shows a sub-pixel pattern table.

DESCRIPTION OF THE PREFERRED EMBODIMENTS

Embodiments of the present invention will be described below.

A case wherein input multi-value image data is subjected to a half-tone process on the basis of an algorithm based on a cellular neural network to obtain binary data will be described first.

Figure 1:
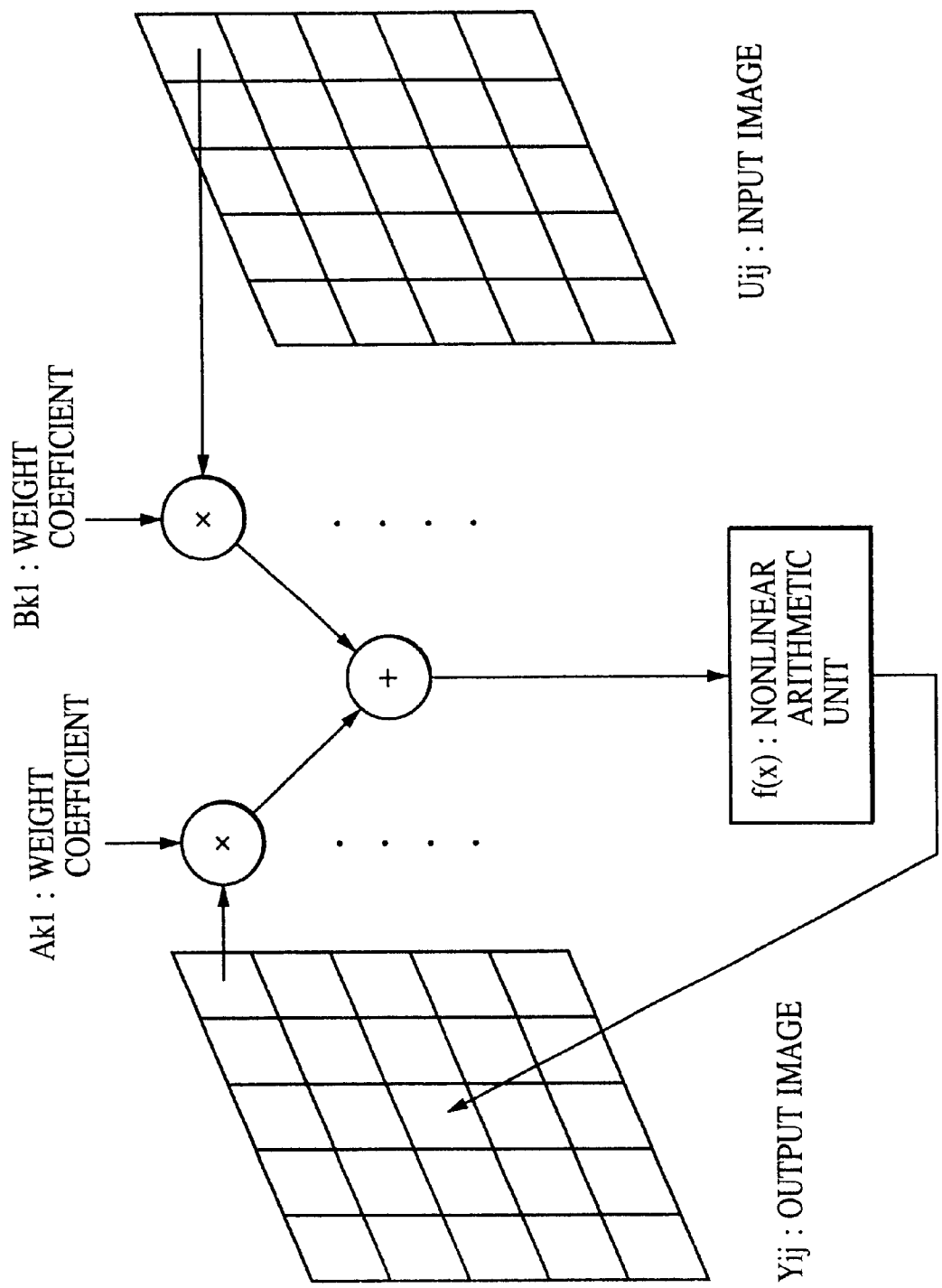
FIG. 1 is a view for explaining the concept of an image process using a DTCNN according to the embodiment of the present invention.

FIG. 1 is a view for explaining an algorithm based on a discrete-time cellular neural network (DTCNN) for performing a binary half-tone process.

Referring to FIG. 1, a sum of products of output low-bit image value Yij and output weight values Akl in a 5×5 neighborhood image area of an output image with respect to an interested pixel:

$$\sum_{k,l} Ak, 1 * Yi - k, j - 1 \text{ and}$$

a sum of products of input variable-density image Uij and input weight values Bkl in a 5×5 neighborhood image area of an input image:

$$\sum_{k,l} Bk, 1 * Ui - k, j - 1$$

are added to each other to calculate $$j = \sum_{k,l} Ak, 1 * Yi - k, j - 1 + \sum_{k,l} Bk, 1 * Ui - k. \quad \text{(Equation 1)}$$

Here, the input Ui,j is a real-number value between −1.0 and +1.0, and the output Yi,j has one of two values −1.0 and +1.0.

As the values of Ak,l and Bk,l, the following values are used:

Ak,l =
−0.125, −0.287, −0.368, −0.287, −0.125
−0.287, −0.607, −0.779, −0.607, −0.287
−0.368, −0.779, −0.000, −0.779, −0.368
−0.287, −0.607, −0.779, −0.607, −0.287
−0.125, −0.287, −0.368, −0.287, −0.125    (Equation 2)

Bk,l =
0.125, 0.287, 0.368, 0.287, 0.125
0.287, 0.607, 0.779, 0.607, 0.287
0.368, 0.779, 1.000, 0.779, 0.368
0.287, 0.607, 0.779, 0.607, 0.287
0.125, 0.287, 0.368, 0.287, 0.125    (Equation 3)

The results of (Equation 1) are calculated for red (R), green (G), and blue (B), respectively, and input to a non-linear arithmetic unit to obtain the following equation:

$$Yi,j = f(Xi,j) \quad \text{(Equation 4)}$$

In the nonlinear arithmetic unit, Xi,j of each color is compared with a predetermined threshold value (0 in this case) to calculate Yi,j for each color.

The result Yi,j of the nonlinear arithmetic operation is defined as an image value of an output image of an interested pixel.

This arithmetic operation is performed for all the pixels in the image and repeated until the results are converged.

Convergence will be described below. Output results from all the pixels are set to be random values, and binarized results of all the pixels of the image are calculated on the basis of (Equation 1). An arithmetic operation is performed again by (Equation 1) on the basis of the binarized results calculated. The binarized results calculated first are compared with binarized results calculated second. As a result, if the number of pixels having binarized results which change is a predetermined number or more, it is determined that the results are not converged, and binarized results of all the pixels are calculated on the basis of (Equation 1) again. The binarized results which are newly calculated are compared with the binarized results which are previously calculated, and pixels having values which change are counted. In the comparison of the binarized results, if the number of pixels having results which change is a predetermined value or less, it is determined that the results are converged.

More specifically, the arithmetic operation based on (Equation 1) is repeated until the results are converged.

Figure 2:
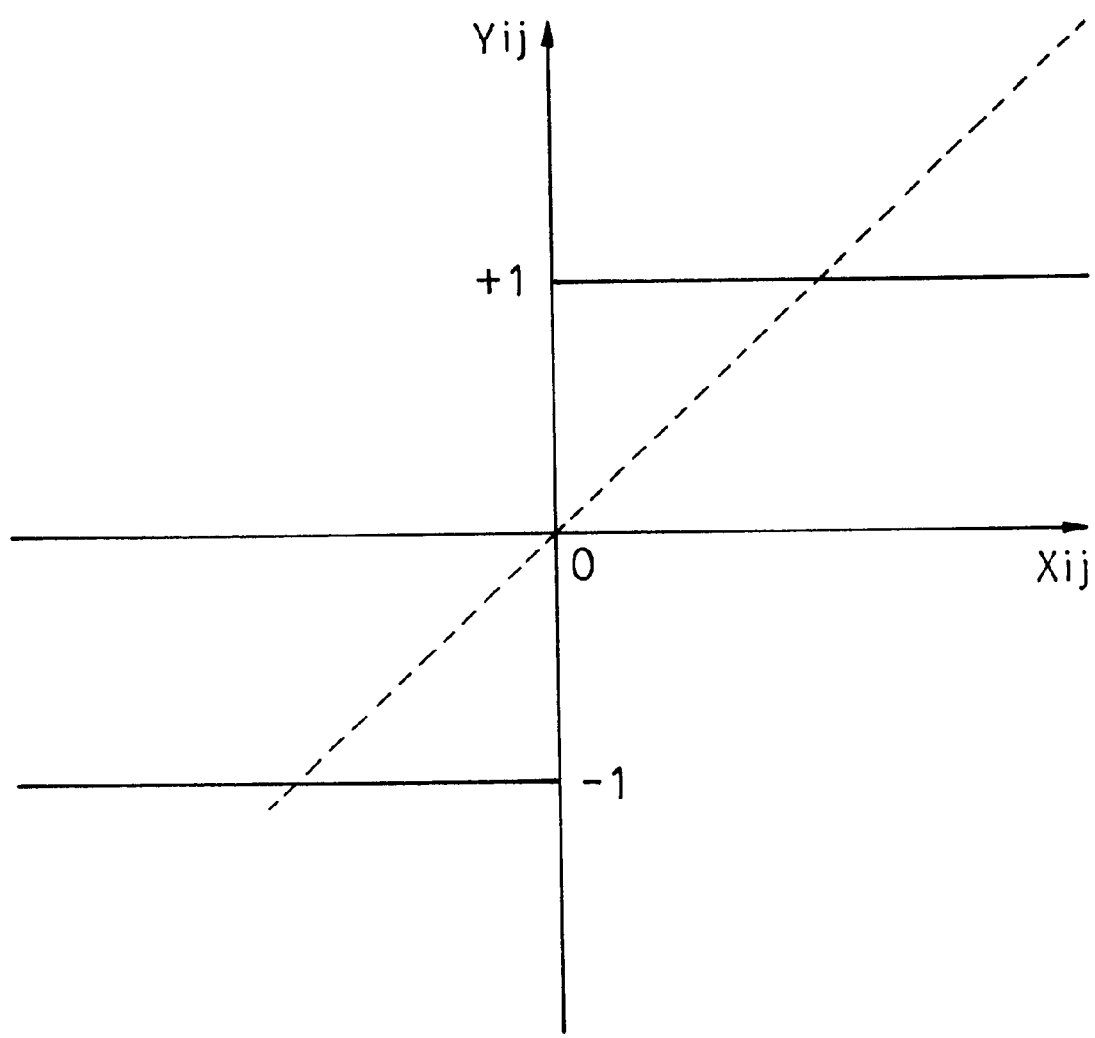
FIG. 2 is a graph for explaining the nonlinear arithmetic unit in FIG. 1 when a binary half-tone process is performed.

FIG. 2 is a graph showing an operation of the nonlinear arithmetic unit f(x) in FIG. 1 when a binary half-tone process is performed. In FIG. 2, the arithmetic result Xi,j of (Equation 1) is compared with 0. If the arithmetic result Xi,j is 0 or more, Yi,j is blnarized into 1; and if the arithmetic result Xi,j is 0 or less, Yi,j is binarized into −1.

In order to perform a multi-value half-tone process by using this method, the binary nonlinear arithmetic unit may be changed into a multi-value nonlinear arithmetic unit.

Figure 3:
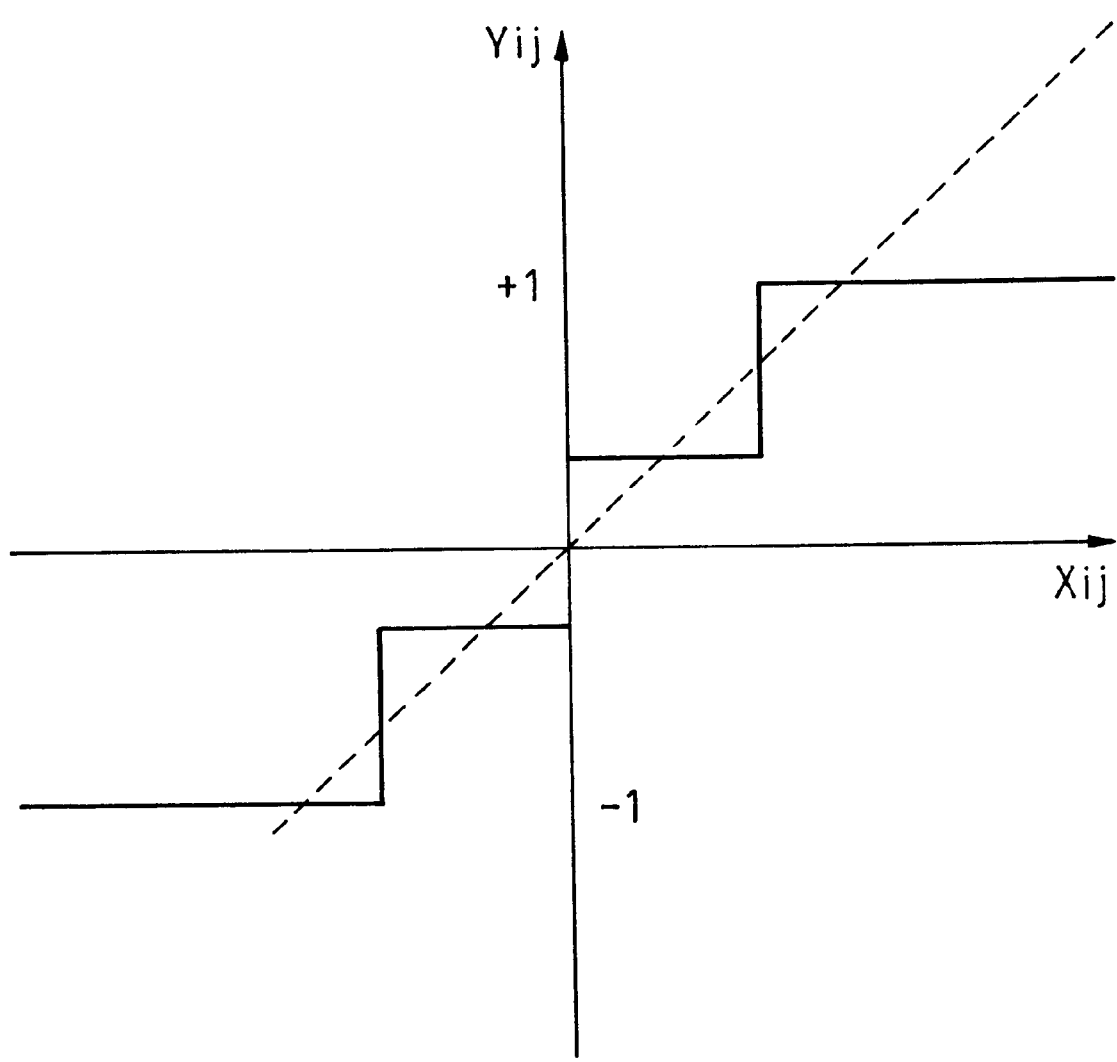
FIG. 3 is a graph for explaining the nonlinear arithmetic unit in FIG. 1 when a quaternary half-tone process is performed.

For example, when a quaternary half-tone process is to be performed, the operation of the nonlinear arithmetic unit f(x) in FIG. 1 is designed such that four types of outputs Yi,j are output with respect to an input Xi,j as shown in FIG. 3.

As the embodiment of the present invention, a case wherein pixels have different luminances (areas) and the different numbers of gradation levels and a case wherein a half-tone process is performed while resolution conversion is performed will be described below.

Figure 4:
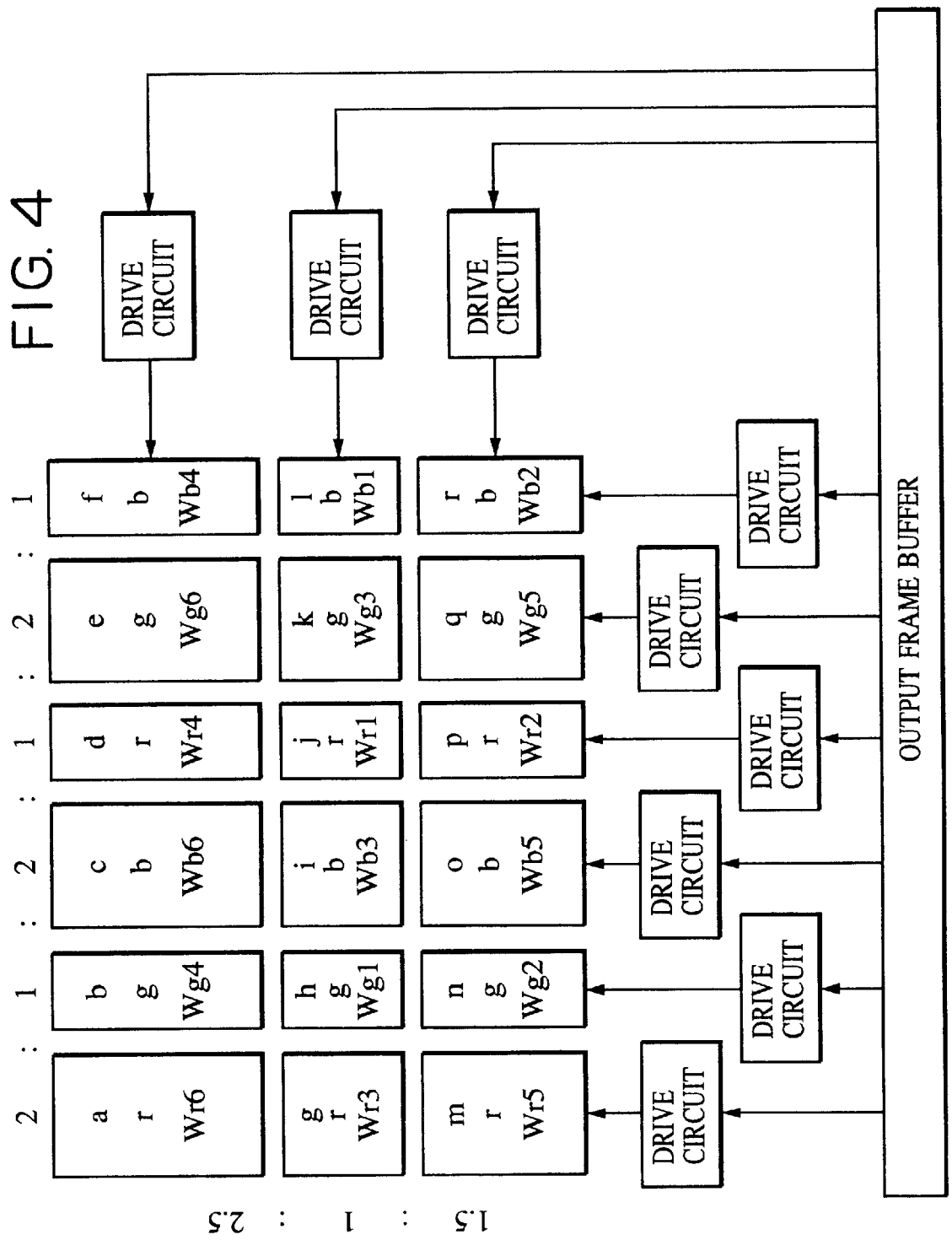
FIG. 4 is a view showing a sub-pixel arrangement of one pixel on an FLC display in a standard resolution mode (1,024×768 dots).

FIG. 4 is a view showing the details of a pixel arrangement when an FLC display (ferroelectric liquid-crystal display) which can display one pixel at a plurality of levels is driven in a standard resolution mode (1,024×768 dots). FIG. 4 shows t he state of one pixel.

In this standard resolution mode, when sub-pixels (a to r) are combined with each other, the following 29 values can be expressed:

0.0, 1.0, 1.5, 2.0, 2.5, 3.0, 3.5, 4.0, 4.5,
5.0, 5.5, 6.0, 6.5, 7.0, 7.5, 8.0, 8.5, 9.0,
9.5,
10.0, 10.5, 11.0, 11.5, 12.0, 12.5, 13.0,
13.5, 14.0, 15.0.

Figure 5:
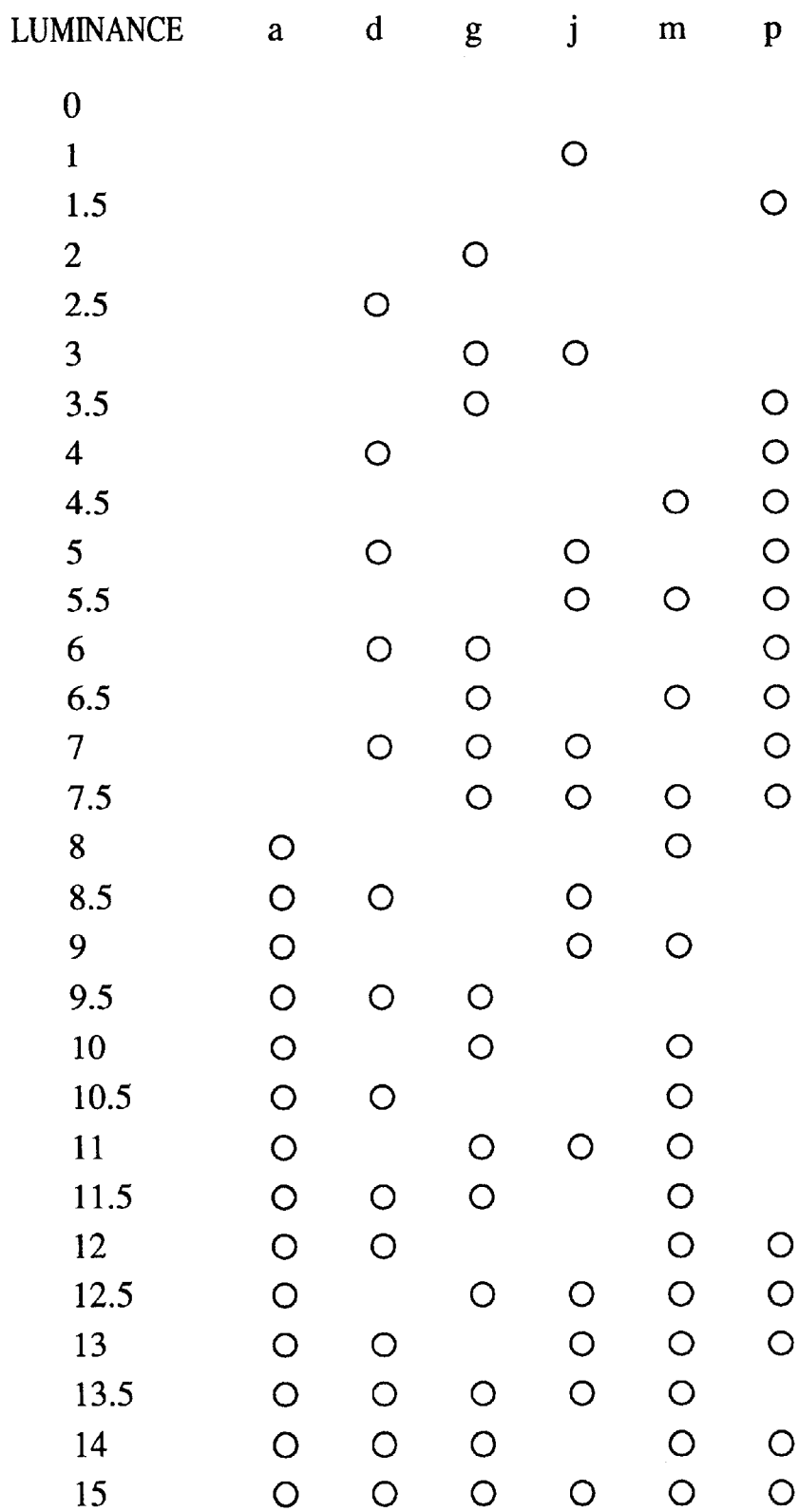
FIG. 5 is a table showing ON sub-pixels with respect to the luminance of R data in a standard resolution mode.

FIG. 5 shows a combination of pixels for expressing the 29 values in r (red).

In FIG. 5, a, d, g, j, m, and p are symbols shown in FIG. 4 to specify the pixels.

Figure 6:
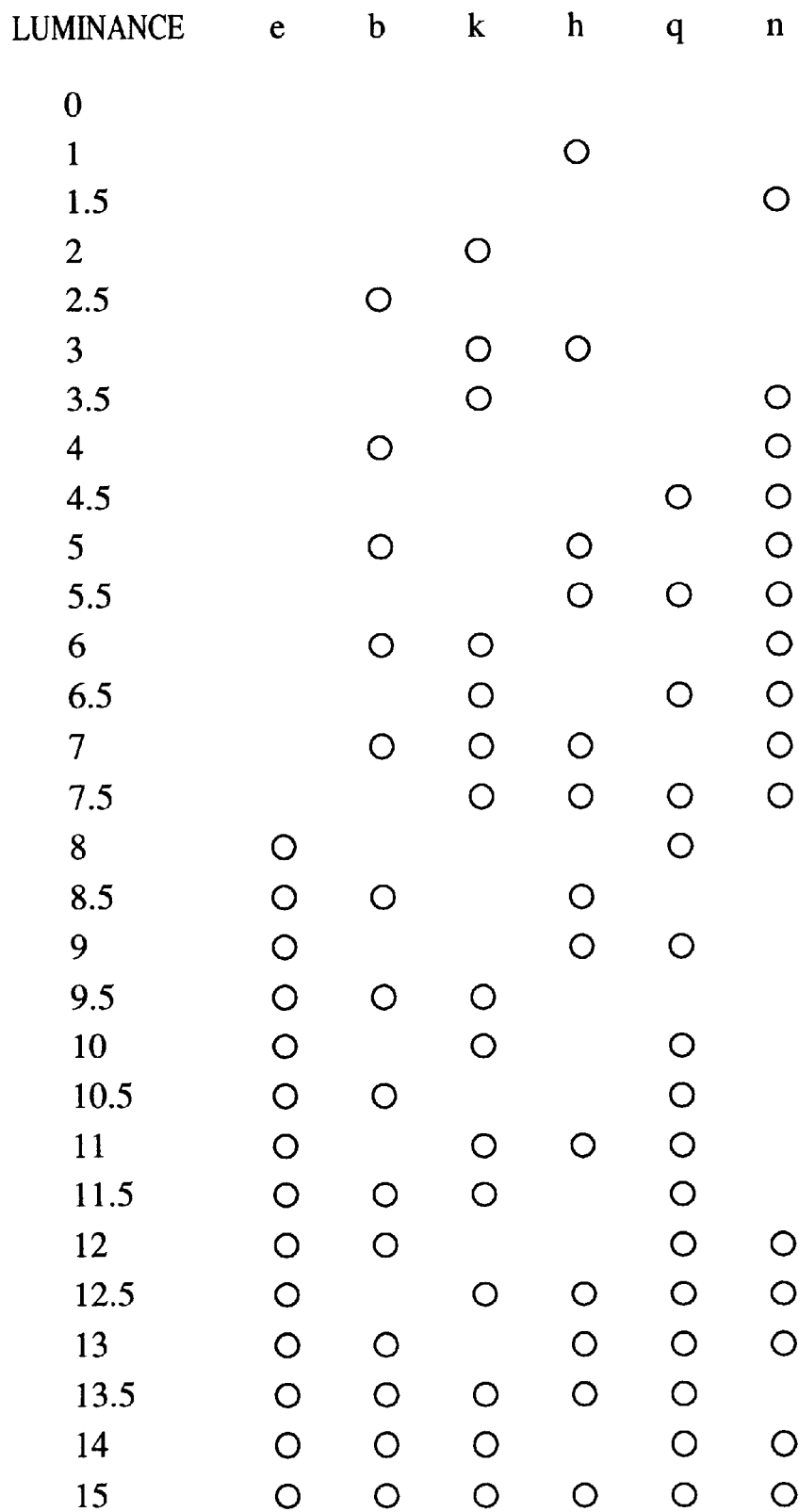
FIG. 6 is a table showing ON sub-pixels for the luminance of G data in a standard resolution mode.

FIG. 6 shows a combination of pixels for expressing the 29 values in g (green).

Figure 7:
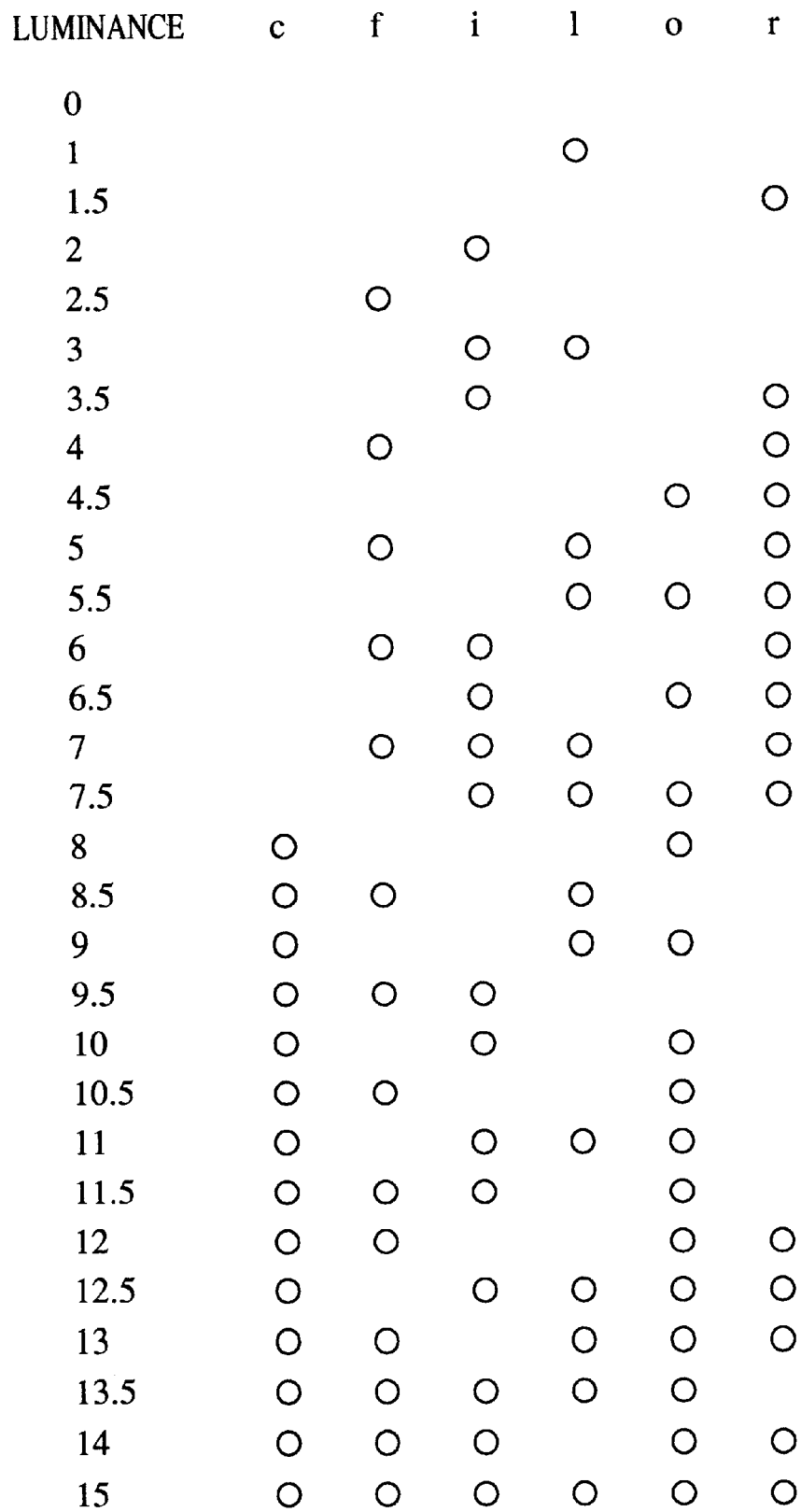
FIG. 7 is a table showing ON sub-pixels with respect to the luminance of B data in a standard resolution mode.

In FIG. 6, e, b, k, h, q, and n are symbols shown in FIG. 4 to specify the pixels. FIG. 7 shows a combination of pixels for expressing the 29 values in b (blue). In FIG. 7, c, f, i, l, o, and r are symbols shown in FIG. 4 to specify the pixels. It is assumed that the output values Yi,j of the pixels can be set within the range given by normalizing values 0 to 15 into values −1.0 to +1.0.

Figure 9:
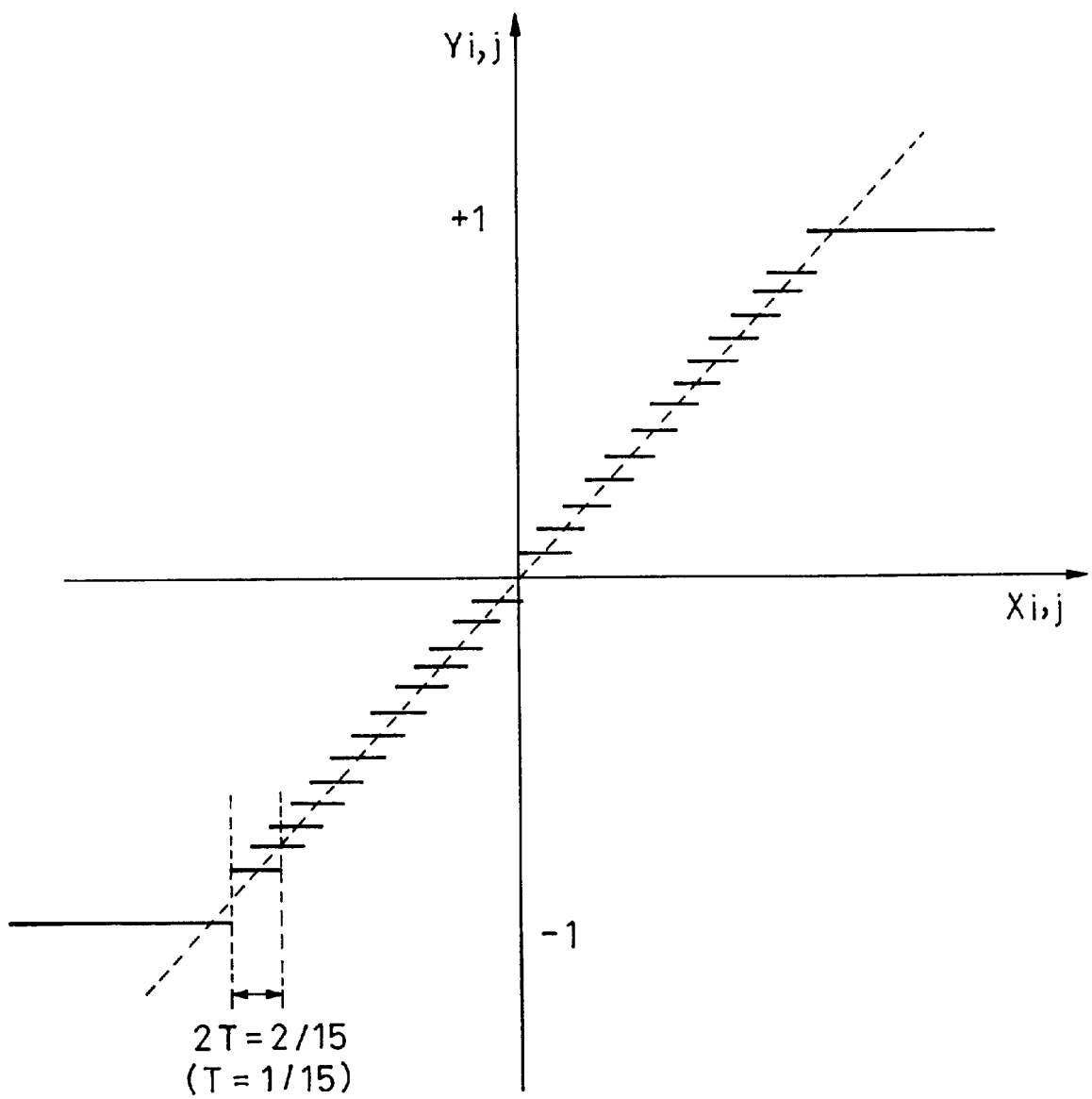
FIG. 9 is a graph showing the relationship between Yi,j and Xi,j in the standard resolution mode.

FIG. 9 shows the relationship between Xi,j and Yi,j in the standard resolution mode. In FIG. 9, Yi,j ranging from −1 to +1 is quantized at 29 levels.

Figure 8:
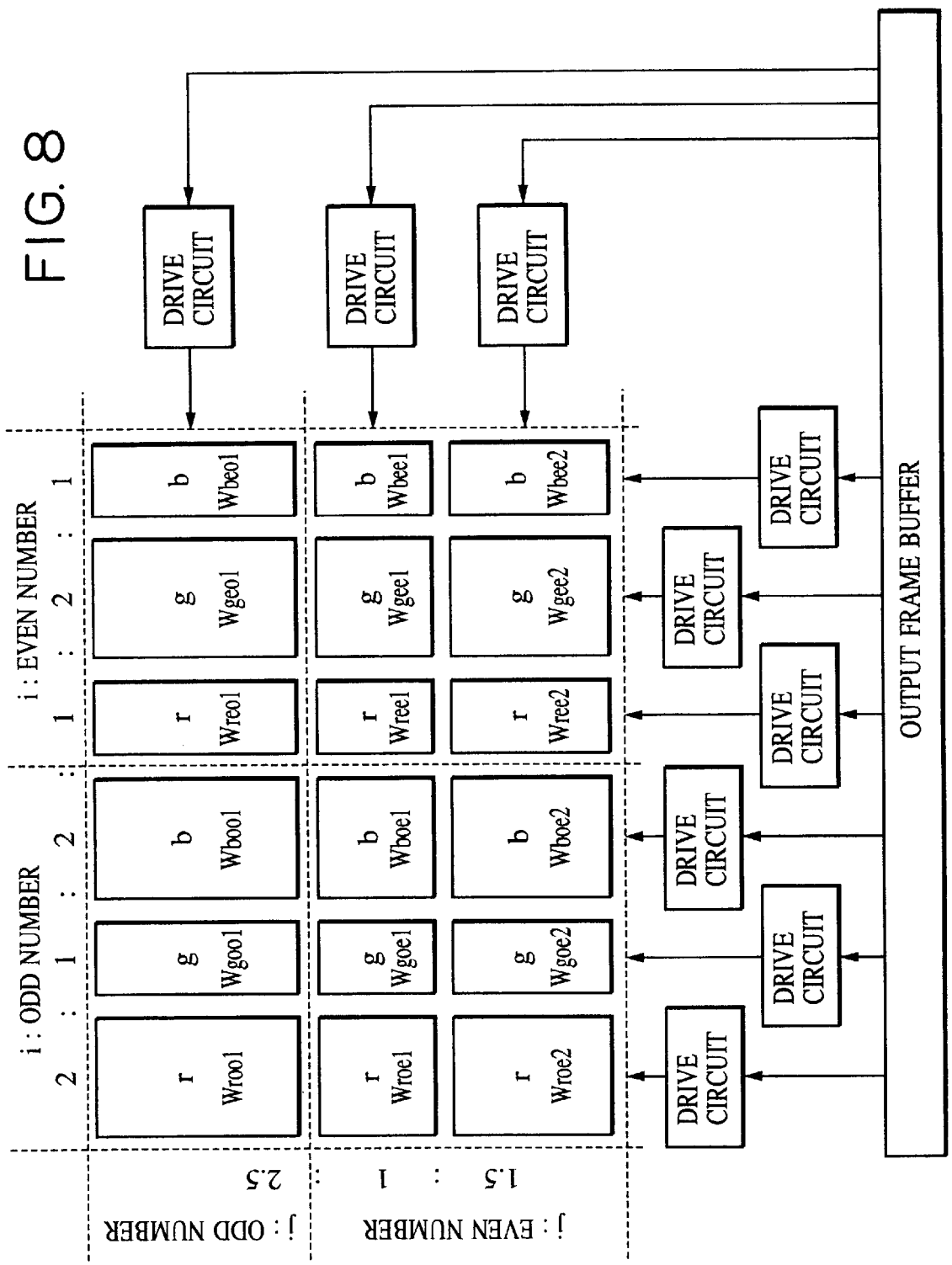
FIG. 8 is a view showing a sub-pixel arrangement of four pixels on an FLC display in a high resolution mode (2,048× 1,536 dots).

FIG. 8 is a view showing the details of a pixel arrangement when the FLC display is driven in a high resolution mode (2,048×1,536 dots). As is apparent from FIG. 8, in the high resolution mode, a pixel in the standard resolution mode is vertically (j) and horizontally (i) into four pixels, and a number which is four times the number of pixels is used as the number of pixels.

More specifically, in the standard resolution mode, a 29-level maximum luminance of 15 can be expressed by one pixel. However, in the resolution mode, since a maximum luminance of 15 can be obtained per four pixels, a luminance of 15/4 can be obtained as an average in one pixel.

However, since the maximum luminance of r (red) and b (blue) at the position defined by i: odd number and j: odd number or the maximum luminance of g (green) at the position defined by i: even number and j: odd number in the high resolution mode shown in FIG. 8 is 5, values obtained by normalizing 0 to 5 into $-5/(15/4)=-4/3$ to $+5/(15/4)=+4/3$ are used as $Y_{i,j}$.

Figure 10:
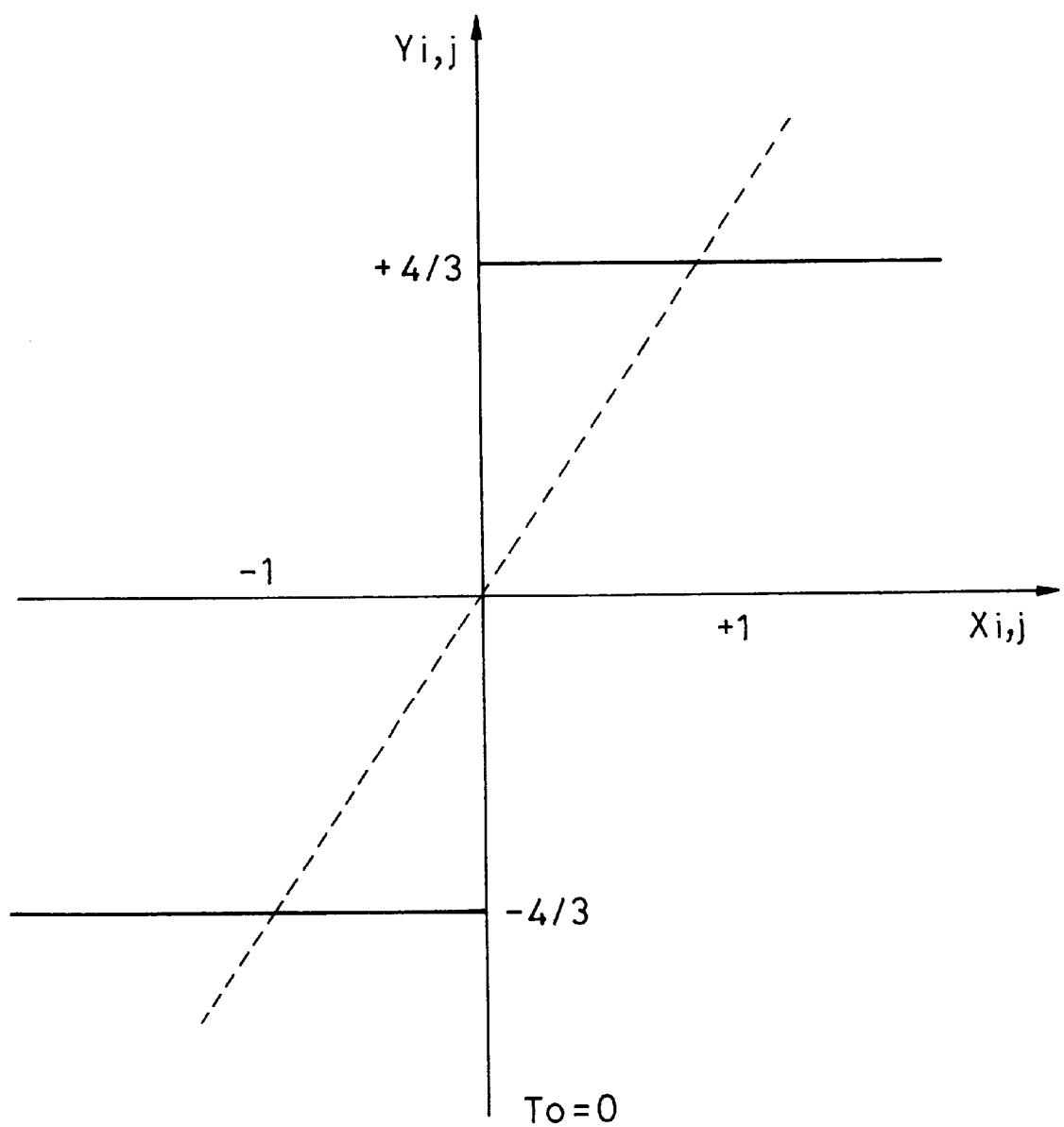
FIGS. 10 to 13 are graphs showing the relationship between Xi,j and Yi,j of a predetermined sub-pixel in the high resolution mode.

FIG. 10 shows the relationship between $X_{i,j}$ and $Y_{i,j}$ of r (red) and b (blue) at the position defined by i: odd number and j: odd number or g (green) at the position defined by i: even number and j: odd number in the high resolution mode in FIG. 8. More specifically, in this case, $Y_{i,j}$ is quantized in a binary manner.

Similarly, since the maximum luminance of g (green) at the position defined by i: odd number and j: odd number or the maximum luminance of r (red) and b (blue) at the position defined by i: even number and j: odd number in the high resolution mode shown in FIG. 8 is 2.5, values obtained by normalizing 0 to 2.5 into $-2.5/(15/4)=-2/3$ to $+2.51(15/4)=+2/3$ are used as $Y_{i,j}$.

Figure 11:
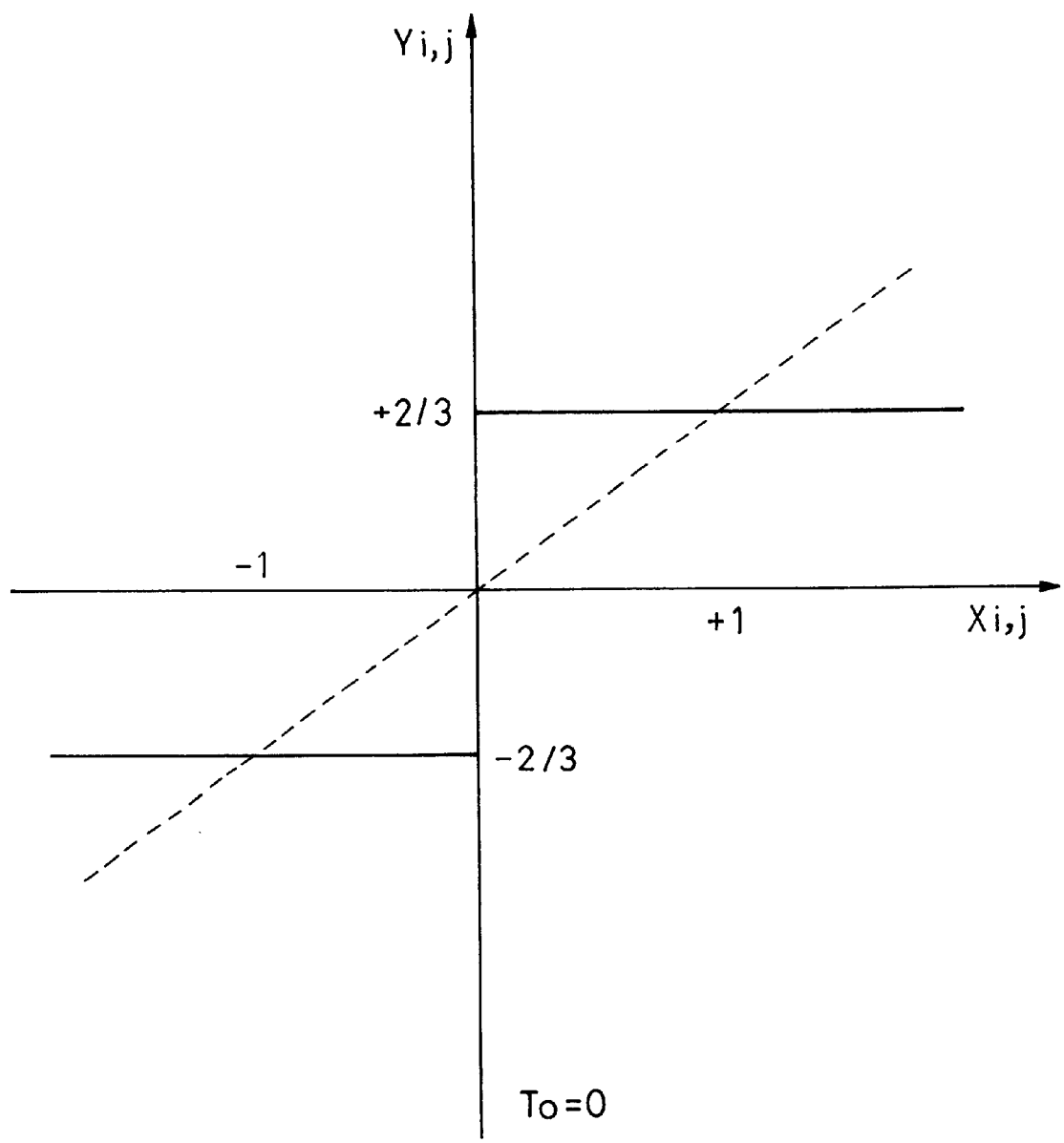

FIG. 11 shows the relationship between $X_{i,j}$ and $Y_{i,j}$ of g (green) at the position defined by i: odd number and j: odd number or r (red) and b (blue) at the position defined by i: even number and j: odd number in the high resolution mode in FIG. 8. More specifically, in this case, $Y_{i,j}$ is quantized in a binary manner.

Since the maximum luminance of r (red) and b (blue) at the position defined by i: odd number and j: even number or the maximum luminance of g (green) at the position defined by i: even number and j: even number in the high resolution mode shown in FIG. 8 is 5, values obtained by normalizing 0 to 5 into $-5/(15/4\ 4)=-4/3$ to $+5/(15/4)=+4/3$ are used as $Y_{i,j}$.

Figure 12:
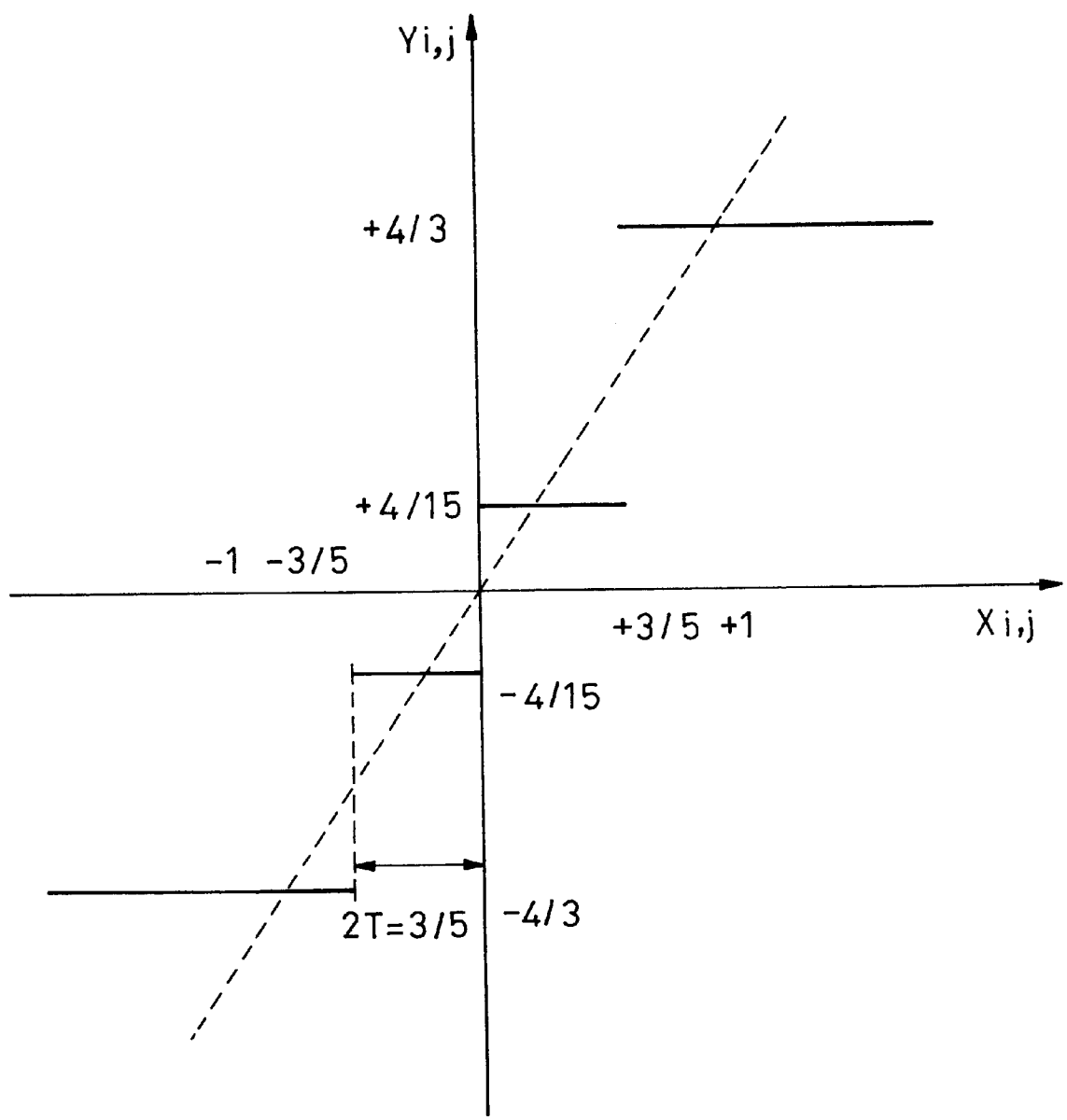

FIG. 12 shows the relationship between $X_{i,j}$ and $Y_{i,j}$ of r (red) and b (blue) at the position defined by i: odd number and j: even number or g (green) at the position defined by i: even number and j: even number in the high resolution mode in FIG. 8. More specifically, in this case, $Y_{i,j}$ is quantized in a quaternary manner because there are two sub-pixels.

Since the maximum luminance of g (green) at the position defined by i: odd number and j: even number or the maximum luminance of r (red) and b (blue) at the position defined by i: even number and j: even number in the high resolution mode shown in FIG. 8 is 2.5, values obtained by normalizing 0 to 2.5 into $-2.5/(15/4)=-2/3$ to $+2.5/(15/4)=+2/3$ are used as $Y_{i,j}$.

Figure 13:
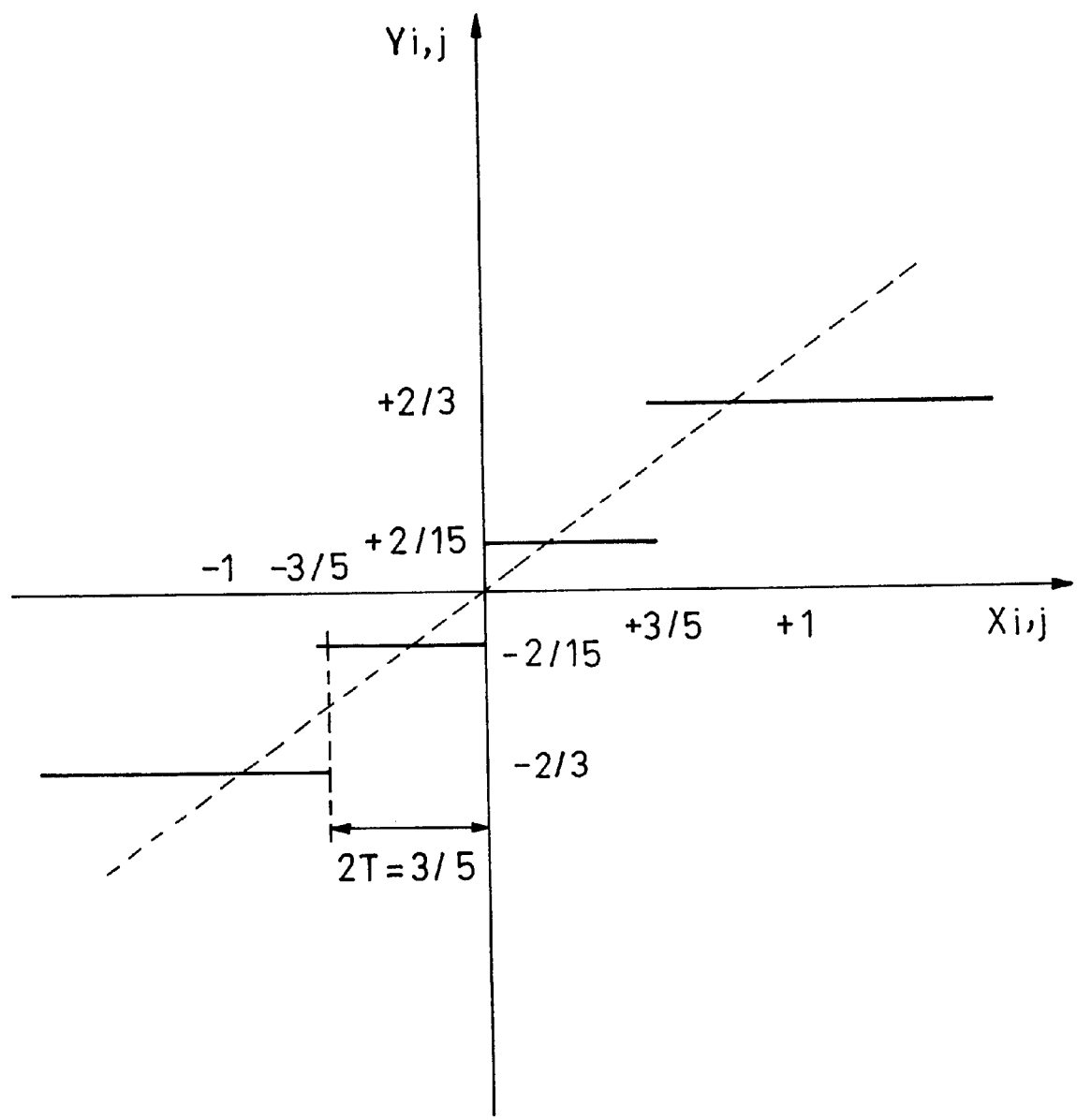

FIG. 13 shows the relationship between $X_{i,j}$ and $Y_{i,j}$ of g (green) at the position defined by i: odd number and j: even number or r (red) and b (blue) at the position defined by i: even number and j: even number in the high resolution mode in FIG. 8.

More specifically, in this case, $Y_{i,j}$ is quantized in a quaternary manner because there are two sub-pixels.

When one pixel is constituted by a plurality of sub-pixels, an output from one pixel can be expressed by a sum of products of outputs from the sub-pixels and luminances (areas) corresponding to the outputs. For this reason, the output from one pixel is given by the following equation:

$$Y_{i,j} = \sum_n W_{n,i,j} * y_{n,i,j} \quad \text{(Equation 5)}$$

where, $W_{n,ij}$ is an output maximum luminance weight value which is in proportion to the area of each sub-pixel, $y_{n,i,j}$ is an output from each sub-pixel and is set as $-1.0$ or $+1.0$.

In the standard resolution mode shown in FIG. 4, weight values Wr1, Wr2, Wr3, Wr4, Wr5, and Wr6 for r (red) are given by 1/15, 1.5/15, 2/15, 2.5/15, 3/15, and 5/15, respectively.

In FIG. 4, Wr1, Wr2, Wr3, Wr5, and Wr6 represent corresponding pixel positions, respectively.

Weight values Wg1, Wg2, Wg3, Wg4, Wg5, and Wg6 for g (green) are given by 1/15, 1.5/15 2/15, 2.5/15, 3/15, and 5/15, respectively, and represent corresponding pixel positions in FIG. 4.

Weight values Wb1, Wb2, Wb3, Wb4, Wb5, and Wb6 for b (blue) are given by 1/15, 1.5/15 2/15, 2.5/15, 3/15, and 5/15, respectively, and represent corresponding pixel positions in FIG. 4.

In the high resolution mode shown in FIG. 8,
a weight Wroo1 for r (red) and a weight Wboo1 for b (blue) at the position defined by i: odd number and j: odd number or a weight Wgoo1 for g (green) at the position defined by i: even number and j: odd number is 4/3 given by the following equation:
(luminance value÷luminance value of 1 pixel in high resolution mode=5÷15/4).

A weight Wgoo1 for g (green) at the position defined by i: odd number and j: odd number or a weight Wroo1 for r (red) and a weight Wboo1 for b (blue) at the position defined by i: even number and j: odd number is 2/3 given by the following equation:
(2.5÷15/4).

Weights Wroe1 and Wroe2 for r (red) at the position defined by i: odd number and j: even number are respectively given by:
8/15(2÷15/4) and 4/5(3÷15/4).

Weights Wboe1 and Wboe2 for b (blue) at the position defined by i: odd number and j: even number are respectively given by:
8/15(2÷15/4) and 4/5(3÷15/4).

Weights Wgoe1 and Wgoe2 for g (green) at the position defined by i: even number and j: even number are respectively given by:
8/15(2÷15/4) and 4/5(3÷15/4).

Weights Wgoe1 and Wgoe2 for g (green) at the position defined by i: odd number and j: even number are respectively given by:
4/15(1÷15/4) and 2/5(1.5÷15/4).

Weights Wree1 and Wree2 for r (red) at the position defined by i: even number and j: even number are respectively given by:
4/15(1÷15/4) and 2/5(1.5÷15/4).

Similarly, weights Wbeo1 and Wbeo2 for b (blue) at the position are 4/15 and 2/5, respectively.

(Equation 2), (Equation 3), and (Equation 5) are substituted in (Equation 1) to calculate $X_{i,j}$. However, since $Y_{i,j}$ cannot be calculated by (Equation 4), $y_{n,i,j}$ serving as an output value is calculated by the following method:

$$, j = x_{i,j} - \sum_m W_{m,i,j} * y_{n,i,j} + T * y_n \quad \text{(Equation 6)}$$

$y_{n,i,j}=f(x_{n,i,j})$ (Equation 7)
where $f(x_n,i,j)$ is the function shown in FIG. 4:
$f(x_n,i,j)=+1.0$ ($x_n,i,j>=0$)
$f(x_n,i,j)=-1.0$ ($x_n,i,j<0$)

More specifically, with respect to n which is selected at random, $X_{i,j}$ which is obtained by substituting $y_{n,i,j}$ and (Equation 2), (Equation 3), and (Equation 5) in (Equation 1) is substituted in (Equation 6) to calculate $x_{n,i,j}$.

This $x_{n,i,j}$ is substituted in (Equation 7) to calculate $y_{n,i,j}$.

This operation is repeated until convergence is achieved (i.e., until the change in $y_{n,i,j}$ is eliminated). The value $y_{n,i,j}$ obtained when convergence is achieved is the calculated result.

In (Equation 6), T is used to give a hysteresis to $Y_{i,j}$ obtained by arithmetically operating (Equation 6) and (Equation 7). For example, T=1/15 is set in the standard resolution mode shown in FIG. 4.

FIG. 9 shows the relationship between $X_{i,j}$ and $Y_{i,j}$ in the standard resolution mode when T is given. When T is set to be smaller than 1/15, the value $Y_{i,j}$ cannot be obtained near $X_{i,j}=14/15$ and near $X_{i,j}=14/15$.

When T is set to be larger than 1/15, the value $Y_{i,j}$ cannot be obtained near $X_{i,j}=14/15$ and $X_{i,j}=-14/15$. However, functions largely overlap.

Although FIGS. 12 and 13 show functions of $X_{i,j}$ and $Y_{i,j}$ in a pixel which can perform a quaternary display in a high resolution mode, since the step width of a step-like function given by 2T must be 3/5, Te=3/10(2Te =3/5) is satisfied.

In case of the functions shown in FIGS. 10 and 11, since no step-like function is necessary, To=0 is satisfied.

Figure 14:
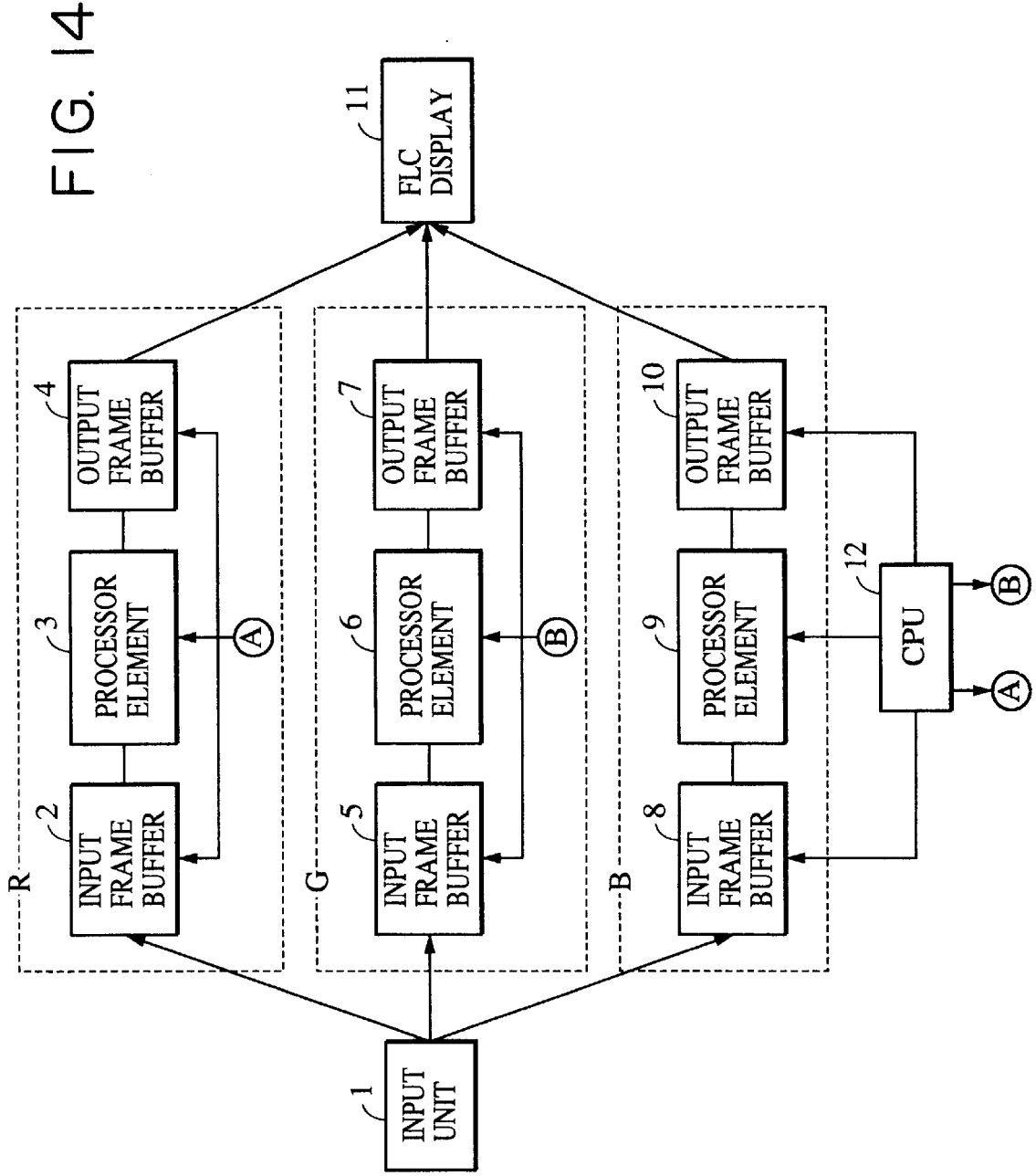
FIG. 14 is a block diagram showing a display system which incorporates a processor for a digital image process in the embodiment.

FIG. 14 is a block diagram showing the arrangement of a display system which incorporates a digital image processor according to this embodiment.

Referring to FIG. 14, reference numeral 1 denotes an image input unit for inputting a variable-density color image consisting of pixels each of which consists of a plurality of bits. Here, 8-bit data of R, G, and B pixels are input. The image input unit 1 is constituted by, e.g., a digital camera, a scanner, or a computer. Reference numeral 2 denotes an input frame buffer in which red (R) data is stored. Image data of a plurality of lines is temporarily stored in the input frame buffer 2.

In this case, when output data of an interested pixel is determined, a sum of products is calculated in a 5×5 area of the input image. For this reason, data of at least 5 lines is temporarily stored in the input frame buffer 2.

Referring to FIG. 14, reference numeral 3 denotes a processor element concerning R. As basically shown in FIG. 1, the processor element adds a sum of products $\pi A_{k,l}*Y_{i-k,j-1}$ of output image data and an output weight value to a sum of products $\pi B_{k,l}*U_{i-k,j-1}$ of input image data and an input weight value on the basis of the algorithm of the DTCNN to output the addition result. An input image and an output image of a predetermined area are considered by the DTCNN algorithm, data which is faithful to the input image as much as possible is output as data of an interested pixel to an output frame buffer 4. Since the processor element 3 in this embodiment uses the output device shown in FIG. 4, a process obtained by complicating the basic process shown in FIG. 1. For this reason, the details of the process will be described below by using FIG. 15.

Reference numeral 4 denotes an output frame buffer concerning R. This output frame buffer 4 stores quantized multi-value image data in correspondence with each sub-pixel of the display. Input frame buffers concerning green (G) and blue (B) are represented by reference numerals 5 and 8, respectively, and processor elements are represented by reference numerals 6 and 9, respectively. Output frame buffers are represented by reference numerals 7 and 10, respectively.

Reference numeral 11 denotes a ferroelectric liquid-crystal display (FLC display). One pixel of this display is constituted by sub-pixels of R, G, and B as shown in FIG. 4.

Reference numeral 12 denotes a CPU connected to input frame buffers 2, 5, and 8, the image processors 3, 6, and 9, and the output frame buffers 4, 7, and 10 to perform address control for data transfer, control of the image processors, or the like. The CPU 12 comprises a ROM in which a control program is stored and a RAM serving as a work area.

Figure 15A:
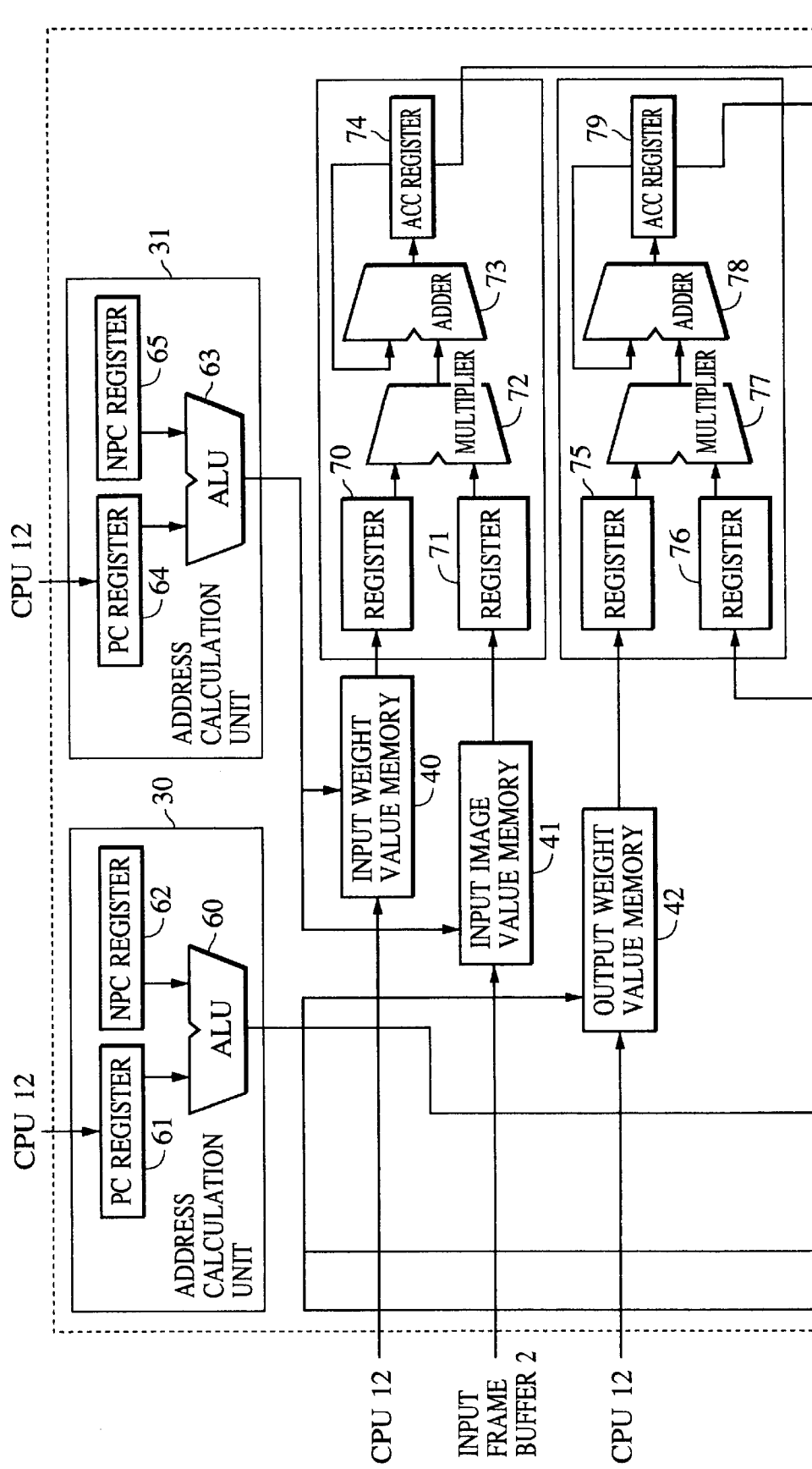
FIG. 15 is a block diagram showing the details of processor elements in FIG. 14.

FIG. 15 is a block diagram showing the details of the processor element 3. The processor elements 6 and 9 have the same arrangement as that of the processor element 3. The processor element is constituted by an address calculation unit 30, an address calculation unit 31, an input weight value memory 40, an input image value memory 41, an output weight value memory 42, an output luminance weight value memory 43, an output image value memory 44, a T value memory 90, a product-sum arithmetic unit 50, a product-sum arithmetic unit 51, a product-sum arithmetic unit 52, a register 53, a multiplier 54, an adder 55, and a nonlinear arithmetic unit 56.

The address calculation unit 30 is constituted by an ALU 60, a PC register 61, and an NPC register 62. The address calculation unit 31 is constituted by an ALU 63, a PC register 64, and an NPC register 65.

The PC register 61 stores the address of a pixel to be processed of an output image on the basis of a command from the CPU. The NPC register 62 stores the image position of a neighborhood system.

The PC register 64 stores the address of a pixel to be processed of an input image on the basis of a command from the CPU. The NPC register 65 stores the image position of a neighborhood system.

As values stored in the NPC register 62 and the NPC register 65, values between (−2,−2) to (2,2) are stored on the assumption that the neighborhood system used in processing has a size if 5×5. For this purpose, the NPC registers 62 and 65 incorporate increments which can update these values.

The address of a neighborhood pixel is calculated on the basis of the values of the NPC register 62 and the PC register 61 to control the output weight value memory 42, the output luminance weight value memory 43, and the output image value memory 44.

In the output weight value memory 42, the value of $A_{k,l}$ (Equation 2) is stored on the basis of a command from the CPU 12.

In the output luminance weight value memory 43, the value of $W_{n,i,j}$ is stored on the basis of a command from the CPU 12.

An output image from each sub-pixel in the neighborhood image area is stored in the output image value memory 44.

The T value memory 90 stores values such as T=1/15 used in the standard resolution mode and Te=3/10 and To=0 used in the high resolution mode.

The address of the neighborhood pixel is calculated on the basis of the values of the NPC register 65 and the PC register 64 to control the input weight value memory 40 and the input image value memory 41.

In the input weight value memory 40, the value of $B_{k,l}$ (Equation 3) is stored on the basis of a command from the CPU 12.

In the input image value memory 41, an input variable-density image in the neighborhood image area is stored.

The product-sum arithmetic unit 50 is constituted by a register 70, a register 71, a multiplier 72, an adder 73, and an ACC register 74.

The product-sum arithmetic unit 51 is constituted by a register 75, a register 76, a multiplier 77, an adder 78, and an ACC register 79.

The product-sum arithmetic unit 52 is constituted by a register 80, a resister 81, a multiplier 82, an adder 83, and an ACC register 84.

The register 70 fetches the value of the input weight value memory 40. The register 71 fetches the value of the input image value memory 41. The register 75 fetches the value of the output weight value memory 42. The register 76 fetches a resultant value of the product-sum arithmetic unit 52. The register 80 fetches the value of the output luminance weight value memory 43. The resister 81 fetches the value of the output image value memory 44.

The multiplier 72 multiplies the values of the register 70 and the register 71 to output Ak,l*Yi−k,j−l. The adder 73 and the ACC register 74 perform an accumulating operation for the multiplier 72 to output the value of Σ,l*Yi−k,j−l.

The multiplier 77 multiplies the values of the register 75 and the register 76 to output Bk,l*Ui−k,j−l. The adder 78 and the ACC register 79 perform an accumulating operation for the multiplier 77 to output the value of ΣBk,l*Ui−k,j−l.

The multiplier 82 multiplies the values of the register 80 and the register 81 to output Wm,i,j*yn,i,j. The adder 83 and the ACC register 84 perform an accumulating operation for the multiplier 82 to output the value of ΣWm,i,j*yn,i,j.

In the register 53, a value T for determining a threshold value read from the T value memory 90 is set by a command from the CPU 12.

The multiplier 54 multiplies the values of the output image value memory 44 and the register 53 to output T*yn,i,j.

The resultant values of the product-sum arithmetic unit 50, the product-sum arithmetic unit 51, the product-sum arithmetic unit 52, the multiplier 54 are input to the adder 55, and the adder 55 outputs a value expressed in (Equation 6) described below:

$$, j = xi, j - \sum_m Wm, i, j * yn, i, j + T * yn$$

The nonlinear arithmetic unit 56 performs an arithmetic operation expressed by (Equation 7) and binarizes the sub-pixels. On the basis of these results, the nonlinear arithmetic unit 56 updates the value of the output image value memory 44.

Binary data is determined for each sub-pixel. In the standard resolution mode in FIG. 4, 29 gradation levels can be expressed for each of R, G, and B as described above. In the high resolution mode, the numbers of gradation levels which can be expressed in R, G, and B are different from each other.

Upon completion of convergence of the arithmetic operation, the value of the output image value memory 44 is transferred to the output frame buffer.

Figure 16:
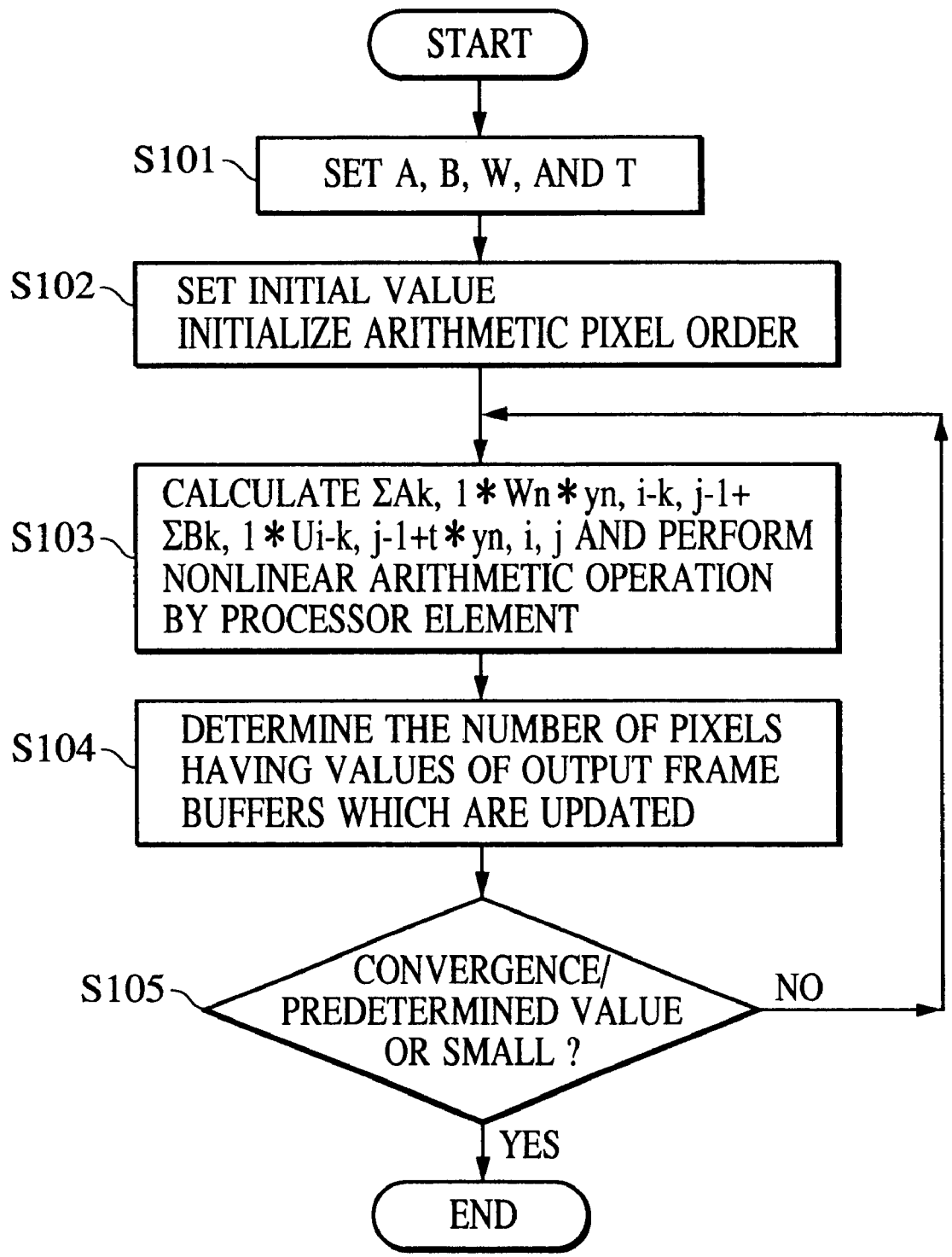
FIGS. 16 and 17 are control flow charts showing operations in the embodiment.
Figure 17:
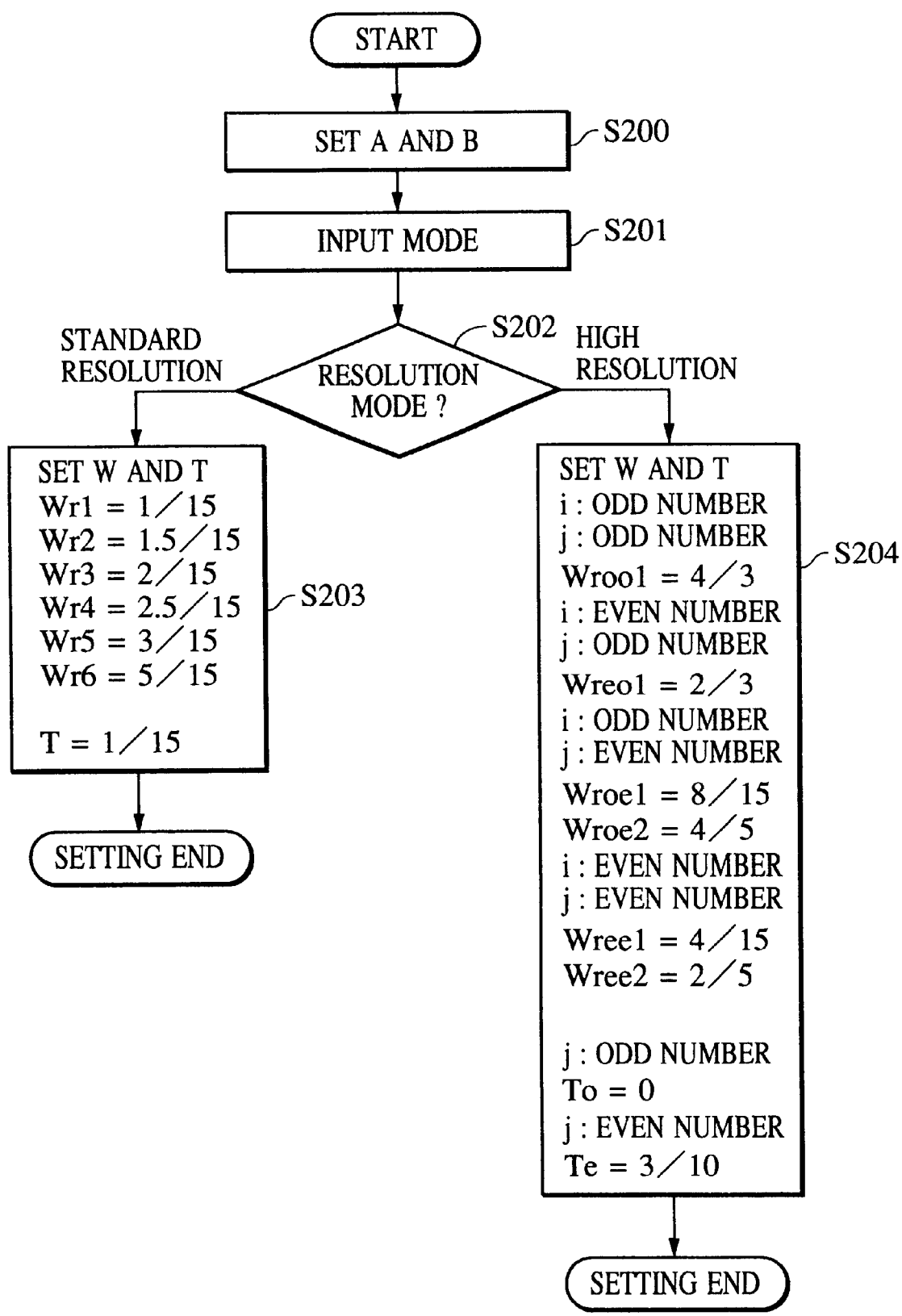

Operation control flow charts in this embodiment are shown in FIGS. 16 and 17. The control will be described below. The flow charts shown in FIGS. 16 and 17 are executed by the CPU 12.

In step S101, an output weight value (A), an input weight value (B), an output luminance weight value (W), and a step width (T) in the function of Xi,j and Yi,j, which values are used in the processor elements, are set.

The details of step S101 are shown in the flow chart in FIG. 17. FIG. 17 shows a flow chart when R data is processed as an example. In control flow charts for G and B data, the values of the weight (W) and (T) to be set in step S204 change. Since this setting has been described above, the flow charts for G and B data corresponding to the flow chart in FIG. 17 will be omitted.

In step S200 in FIG. 17, the output weight value (A) (Equation 2) and the input weight value (B) (Equation 3) are set. These weight values are commonly used in the standard resolution mode and the high resolution mode.

In step S202, it is checked whether a resolution mode displayed by the FLC display is the standard resolution mode or the high resolution mode. This setting is performed by a command from a host computer or the like (not shown).

In the standard resolution mode, the flow shifts to step S203 to set a weight W and T for the standard mode are set. This weight W is described in FIG. 4, and T is described in FIG. 9.

On the other hand, in the high resolution mode, the flow shifts to step S204. Here, a weight W and T for the high resolution mode are set. This weight changes depending on a pixel position and a color as shown in FIG. 8. In case of R, weights used four pixel positions are shown in step S204.

Since a level to be quantized changes depending on a pixel position, as T, To=0 is set in case of binarization corresponding to FIGS. 10 and 11 and Te=3/10 is set in case of quaternarization.

Returning to FIG. 16, in step S102, initial values are set in the output frame buffers 4, 7, and 10. Here, with respect to all the sub-pixels of all the pixels, data of +1 or −1 are set in the output frame buffers at random. Initial values are also set in the input frame buffers 2, 5, and 8. Here, ΣBk,l*Ui−k,j−l is calculated on the basis of the input data and the input weight value to set the value in the input frame buffers.

In the memory in the processor element, on the basis of an output weight value and an output maximum luminance weight value, the value of Ak,l*Wn is calculated and set.

When a product-sum arithmetic operation is executed for all pixel input data of one screen, the order of the arithmetic operations is set. Here, the order of the arithmetic operations is set such that all the pixels are scanned at random. The ON pattern of sub-pixels of an output with respect to an input is also set in a table for performing a nonlinear arithmetic operation. (ON pattern is shown in FIG. 19 as an example)

In step S103, a command is output to the three processor elements on the basis of the order determined in step S102, and an arithmetic operation of $$\Sigma A,k,l*Wn*yn,i-k,j-l+\Sigma Bk,l*Ui-k,j-l+T*yn,i,j$$

and a nonlinear arithmetic operation therefor are executed.

The results are sent to the three frame buffers. If the values are different from the values which are stored in advance, the values are updated.

In step S104, the number of pixels having the values of the output frame buffers which are updated is determined.

In step S105, it is checked whether the number of pixels determined in step S104 is a predetermined value or less. If the number is the predetermined value or less, it is determined that the arithmetic operation based on the DTCNN is converged, and the calculation is ended. Even if the number of pixels does not reach the predetermined value, if the number of repetitions reaches the predetermined value, the calculation is stopped. In the other cases, the flow returns to step S103.

As has been described above, according to this embodiment, even if pixels have different maximum luminances, the different numbers of bits, and the different expression capabilities, an optimum half-tone process can be performed by an algorithm based on a cellular neural network, and a high-quality image can be obtained.

In addition, a 29-value half-tone process can be performed for each of R, G, and B, and binary or quaternary half-tone process depending on the areas of respective pixels of R, G, and B can be performed.

[Another Embodiment]

An example wherein a process is simplified by using a table arithmetic operation will be described below.

An output value from one pixel, as shown in (Equation 5), is expressed as a sum of products of sub-pixels in a pixel and the weights of area ratios:

$$Y_{i,j} = \Sigma W_{n,i,j} * y_{n,i,j}.$$

Here, the value of $W_{n,ij}$ is independent of a pixel at a standard resolution, and, for example, the values of a red pixel correspond to the respective sub-pixel are set to be $W_{r1}=1/15$, $W_{r2}=1.5/15$, $W_{r3}=2/15$, $W_{r4}=2.5/15$, $W_{r5}=3/15$, and $W_{r6}=5/15$.

At a high resolution, the value of $W_{n,i,j}$ changes depending on coordinates, and the value of $W_{n,i,j}$ of a red pixel is set as follows:

when i: odd number and j: odd number, $W_{roo1}=4/3$;
when i: odd number and j: even number, $W_{reo1}=2/3$;
when i: even number and j: odd number, $W_{roe1}=8/15$ and $W_{roe2}=4/5$; and
when i: even number and j: even number, $W_{ree1}=4/15$ and $W_{ree2}=2/5$.

These values are used for calculation of $\Sigma,l*Y_{i-k,j-l}=\Sigma(A_{k,l}*W_{n,i-k,j-l})*y_{n,i-k,j-l}$ which is a sum of products of the output image Yij and an output weight value Akl.

Since $y_{n,i-k,j-l}$ has a value of +1 or −1, a sum of products of $(A_{k,l}*W_{n,i-k,j-l})$ and $y_{n,i-k,j-l}$ can be calculated such that addition and subtraction are performed to $(A_{k,l}*W_{n,i-k,j-l})$ in correspondence with the sign of $y_{n,i-k,j-l}$. When the value of $(A_{k,l}*W_{n,i-k,j-l})$ is calculated in advance and stored in a memory, the sum of products can be calculated without performing multiplication in the repetitive calculation. In addition, since the value of $\Sigma B_{k,l}*U_{i-k,j-l}$, i.e., a sum of products of an input image Uij and an input weight value bk,l, does not change in the middle of the repetitive calculation, the value may be calculated at first.

Figure 18:
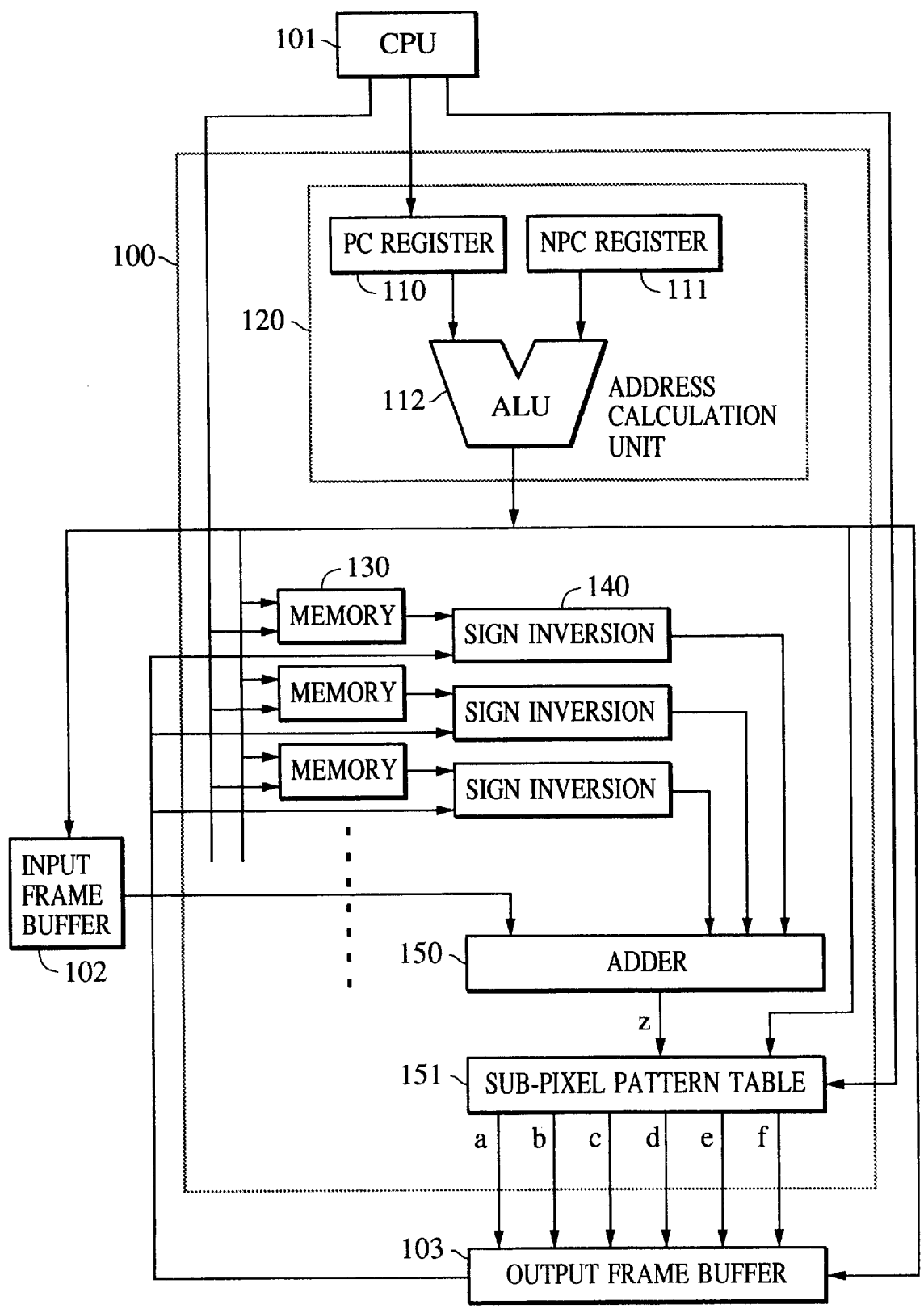
FIG. 18 is a block diagram showing the details of processor elements in another embodiment.

FIG. 18 is a block diagram showing the details of a processor element.

The entire arrangement in another embodiment is the same as that shown in FIG. 14. FIG. 18 shows the details of a processor element of one color in another embodiment.

A processor element 100 has an address calculation unit 120, a memory 130, a sign inverter 140, an adder 150, and a table 151. The address calculation unit 120 is constituted by an ALU 112, a PC register 110, and an NPC register 111.

The PC register 110 stores the address of a pixel to be processed by a command from a CPU 101. The NPC register 111 stores the image position of a neighborhood system. As the value stored in the NPC register 111, a value between (−2,−2) and (2,2) is stored when the neighborhood system used in processing has a size of 5×5. For this reason, the NPC register 111 incorporates an incrementer which can update these values. The address of the neighborhood pixel is calculated on the basis of the values of the NPC register 111 and the PC register 110 to control an input frame buffer, an output frame buffer, and a memory.

In the memory 130, a product of an output weight value and an area weight value $(A_{k,l}*W_{n,i-k,j-l})$ which is calculated by the CPU 101 in advance is stored.

The sign inverter 140 switches the inversion/non-inversion of the sign of the value of the memory 130 depending on whether the value of the output frame buffer of each sub-pixel is +1 or −1.

In calculation, 5×5 neighborhood pixels are used. In a high resolution mode in which each color constituted by 6 sub-pixels, the size of an A template is 5×5=25. The number of memories 130 in which products of the A template and an area ratio weight are stored must be 5×5×6=150. Similarly, 150 sign inverters 140 are required.

The adder 150 adds outputs $(A_{k,l}*W_{n,i-k,j-l})*y_{n,i-k,j-l}$ from all the sign inverters to a value of an input frame buffer 102 in which a sum of products of an input value and a B template is stored in advance to calculate:

$$\Sigma(A_{k,l}*W_{n,i-k,j-l})*y_{n,i-k,j-l}+\Sigma B_{k,l}*U_{i-k,j-l}.$$

Here, since $\Sigma B_{k,l}*U_{i-k,j-l}$ is constant independently of the repetitive calculation, the value is calculated by the CPU in advance and stored in the input frame buffer 102.

The table 151 stores the correspondence between an output $\Sigma(A_{k,l}*W_{n,i-k,j-l})*y_{n,i-k,j-l}+\Sigma B_{k,l}*U_{i-k,j-l}$ from the adder 150 and the ON pattern of sub-pixels. A correspondence between an input (z) and outputs (a, b, c, d, e, and f) of a sub-pixel pattern table is shown in FIG. 19.

Figure 20:
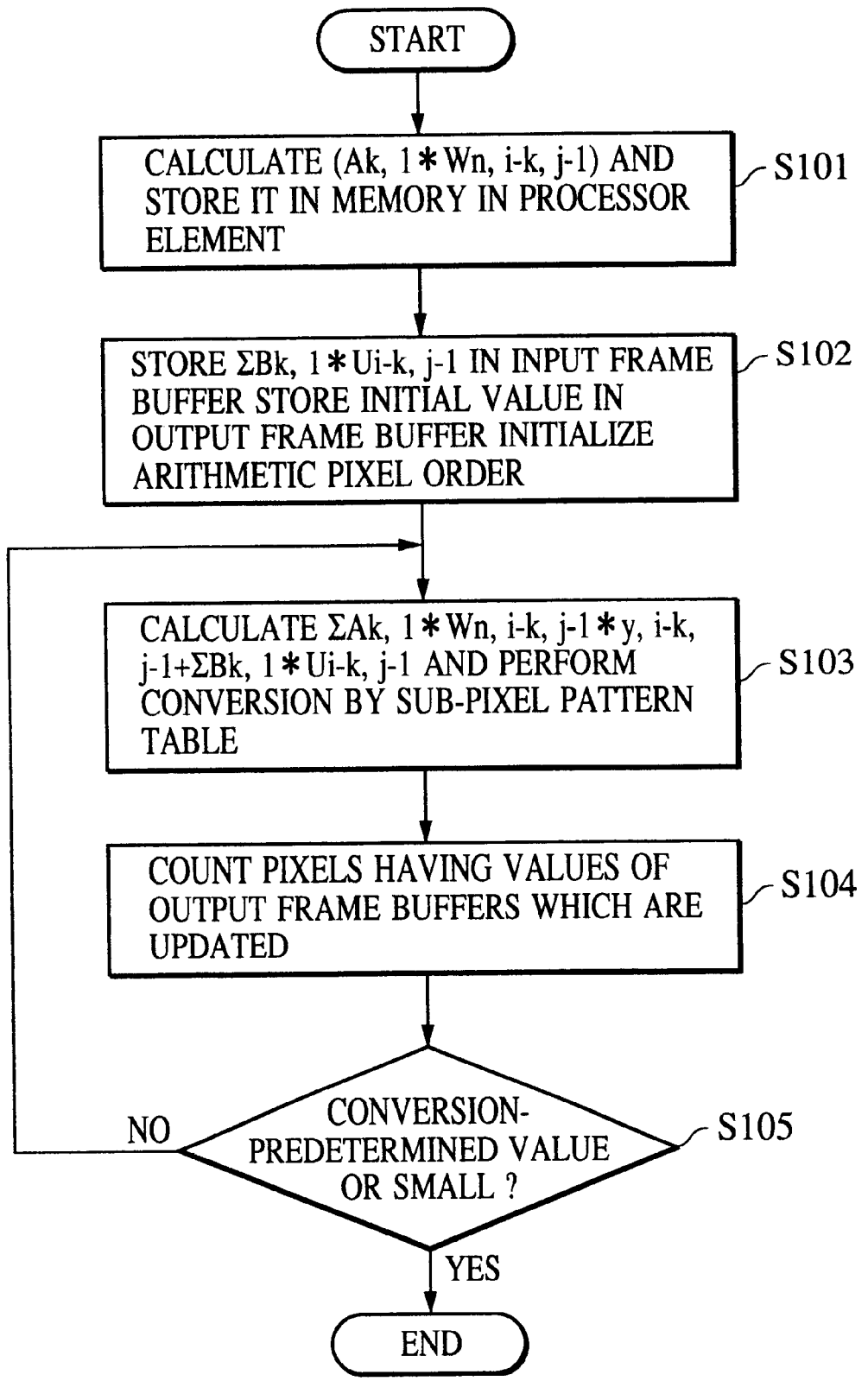
FIG. 20 is a control flow chart showing operations in another embodiment.

An operation control flow chart in this embodiment is shown in FIG. 20. This control will be described below. The control is performed by the CPU 101 connected to the processor element. In step S101, a product $(A_{k,l}*W_{n,i-k,j-l})$ of an output weight value (A) and an output luminance weight value (W) used in the processor element is calculated and stored in the memory 130 in the processor element. Here, the values A and W change depending on whether the resolution is standard or high or whether a selected color is R, G, or B.

More specifically, the output luminance weight value W at the standard resolution is the same as that described in FIG. 4, and is not dependent on the pixel position, but changes depending on colors R, G, and B.

The output luminance weight value W at the high resolution is the same as that shown in FIG. 8, and changes depending on the pixel position and colors.

In step S102, an initial value is set in an output frame buffer. Here, with respect to all the sub-pixels of all the pixels, data of +1 or −1 are set in the output frame buffers at random. An initial value is also set in the input frame buffers. Here, $\Sigma B_{k,l}*U_{i-k,j-l}$ is calculated on the basis of the input data and an input weight value, and set in the input frame buffers.

When a sum of products of all pixel input data of one screen is arithmetically operated, the order of the arithmetic operations is set. Here, the order of the arithmetic operation is set such that all the pixels are scanned.

An ON pattern of sub-pixels of an output with respect to an input as shown in FIG. 19 is set in a table for performing a nonlinear arithmetic operation.

In step S103, an arithmetic operation of $\Sigma(A_{k,l}*W_{n,i-k,j-l})*y_{n,i-k,j-l}+\Sigma B_{k,l}*U_{i-k,j-l}$ and conversion by the sub-pixel pattern are executed on the basis of the order determined in step S102. The result is sent to the output frame buffers. If the value is different from a value stored in an output frame buffer in advance, the value is updated.

In step S104, the number of pixels having the values of the output frame buffers which are updated is checked.

In step S105, it is checked whether the number of pixels determined in step S104 is a predetermined value or less. If the number of pixels is the predetermined value or less, it is determined the arithmetic operation based on the DTCNN is converged, and the calculation is ended. Even if the number of pixels does not reach the predetermined value, if the number of repetitions reaches a predetermined value, the calculate is stopped. In the other cases, the flow returns to step S103.

As described above, according to another embodiment, a half-tone process can be performed in the standard resolution mode and the high resolution mode by updating ana table and the value of the memory with the same hardware. When a product-sum arithmetic operation (sum of products of an output weight value and an output luminance weight value) is divided for respective sub-pixels, and the resultant values are stored in the memories in advance, an arithmetic operation of $\Sigma(Ak,l*Wn,i-k,j-l)*yn,i-k,j-l$ can be performed by only addition.

In addition, since the ON pattern of sub-pixels corresponding to $\Sigma(Ak,l*Wn,i-k,j-l)*yn,i-k,j-l+\Sigma Bk,l*Ui-k,j-l$ is stored in advance, a high-speed process can be performed.

In this embodiment, an FLC display is described as an output device. However, another liquid-crystal display, a printer, or the like can be applied to a case wherein pixels have different maximum luminances, the different numbers of bits, and different color expression capabilities, as a matter of course.

As has been described above, according to the present invention, even if pixels have different maximum luminances, the different numbers of bits, and different color expression capabilities, an optimum half-tone process can be performed in different resolution modes by an algorithm based on a cellular neural network, and a high-quality image can be obtained.

The present invention has been described above with reference to the preferred embodiments. However, the present invention is not limited to the above embodiments, and various modifications of the present invention can be effected without departing from the spirit and scope of the invention.

What is claimed is:

1. An image processing apparatus for quantizing input image data such that the image data is adapted to an output device comprising a plurality of sub-pixels for one pixel, wherein an area size of each sub-pixel changes depending on the position, said apparatus comprising:

first product-sum arithmetic means for arithmetically operating a sum of products of an input weight value and an input variable-density image data in a neighborhood image area;

second product-sum arithmetic means for arithmetically operating a sum of products of an output weight value in the neighborhood image area, a weight value corresponding to the area size of the sub-pixel of each pixel and an output value subjected to a quantizing process;

addition means for adding results from said first and second product-sum arithmetic means;

quantizing means for quantizing an addition result from said addition means; and control means for feeding back an output value obtained by said quantizing means to said second product-sum arithmetic means.

2. An image processing apparatus according to claim 1, wherein a weight value corresponding to an output area ratio in said second product-sum arithmetic means is changed depending on an output resolution.

3. An image processing apparatus according to claim 1, wherein said second product-sum arithmetic means executes a product-sum arithmetic operation by using a table.

4. An image processing apparatus according to claim 1, further comprising display means for displaying an image by using a quantization result of said quantizing means, and
wherein said quantizing means stores a quantization result corresponding to an addition result in a table in advance.

5. An image processing method for quantizing input image data such that the image data is adapted to an output device comprising a plurality of sub-pixels for one pixel, wherein an area size of each sub-pixel changes depending on the position, said method comprising:

a first product-sum arithmetic step of arithmetically operating a sum of products of an input weight value and an input variable-density image data in a neighborhood image area;

a second product-sum arithmetic step of arithmetically operating a sum of products of an output weight value in the neighborhood image area, a weight value corresponding to the area size of the sub-pixel of each pixel and an output value subjected to a quantizing process;

an addition step of adding results from the first and second product-sum arithmetic steps;

a quantizing step of quantizing an addition result from the addition step; and a control step of feeding back an output value obtained by the quantizing step to the second product-sum arithmetic step.

6. An image processing method according to claim 5, wherein a weight value corresponding to an output area ratio in the second product-sum arithmetic step is changed depending on an output resolution.

7. An image processing method according to claim 5, wherein the second product-sum arithmetic step executes a product-sum arithmetic operation by using a table.

8. An image processing method according to claim 5, further comprising the display step of displaying an image by using a quantization result of the quantizing step, and
wherein the quantizing step stores a quantization result corresponding to an addition result in a table in advance.

* * * * *

UNITED STATES PATENT AND TRADEMARK OFFICE
CERTIFICATE OF CORRECTION

PATENT NO. : 6,282,323 B1
DATED : August 28, 2001
INVENTOR(S) : Tanaka et al.

It is certified that error appears in the above-identified patent and that said Letters Patent is hereby corrected as shown below:

<u>Column 1,</u>
Line 41, "method" should read -- methods --;
Lines 42, 56 and 65, "the" should be deleted;

<u>Column 3,</u>
The listing from lines 28 to 35 should read as follows:

$$A_{k,l} = \begin{matrix} -0.125, & -0.287, & -0.368, & -0.287, & -0.125 \\ -0.287, & -0.607, & -0.779, & -0.607, & -0.287 \\ -0.368, & -0.779, & -0.000, & -0.779, & -0.368 \\ -0.287, & -0.607, & -0.779, & -0.607, & -0.287 \\ -0.125, & -0.287, & -0.368, & -0.287, & -0.125 \end{matrix}$$

(Equation 2)

The listing from line 36 to line 43 should read as follows:

$$B_{k,l} = \begin{matrix} 0.125, & 0.287, & 0.368, & 0.287, & 0.125 \\ 0.287, & 0.607, & 0.779, & 0.607, & 0.287 \\ 0.368, & 0.779, & 1.000, & 0.779, & 0.368 \\ 0.287, & 0.607, & 0.779, & 0.607, & 0.287 \\ 0.125, & 0.287, & 0.368, & 0.287, & 0.125 \end{matrix}$$

(Equation 3)

<u>Column 4,</u>
Line 33, "t he" should read -- the --; and
Line 63, "vertically" should read -- divided vertically --.

<u>Column 6,</u>
Line 60, "yn,i,j=f(xn,i,j) (Equation 7)" should be a smaller italic type face and indented in the column; and
Line 62, "(xn,i,j>=0)" should read -- (xn,i,j>0) --.

<u>Column 7,</u>
Line 1, "This" should read -- Thus --;
Line 20, "case" should read -- the case --;
Line 40, "πAk,l*Yi-k,j-1" should read -- ΣAk,l*Yi-k,j-1 --;
Line 42, "πBk,l Ui-k,j-1" should read -- ΣBk,l*Ui-k,j-i --; and
Line 50, "obtained" should read -- is obtained --.

UNITED STATES PATENT AND TRADEMARK OFFICE
CERTIFICATE OF CORRECTION

PATENT NO. : 6,282,323 B1
DATED : August 28, 2001
INVENTOR(S) : Tanaka et al.

It is certified that error appears in the above-identified patent and that said Letters Patent is hereby corrected as shown below:

Column 8,
Line 32, "if" should read -- of --.

Column 9,
Line 6, "resister" should read -- register --; and
Line 11, "Σ,1*Yi-k,J-1." should read -- ΣAk,1*Yi-k,j-1. --.

Column 10,
Lines 11, 14 and 15, "case" should read -- the case --;
Line 12, "used" should read -- used in --;

Column 11,
Line 6, "Wn,ij" should read -- Wn,i,j --;
Line 8, "correspond" should read -- corresponding --;
Line 21, "Σ,l*Yi-k,j-1=Σ" should read -- Σak,1*Yi-k,j-l=Σ --; and
Line 63, "constituted" should read -- is constituted --.

Column 12,
Line 61, "calculate" should read -- calculation --; and
Line 65, "and" should read -- a --.

Signed and Sealed this

First Day of July, 2003

JAMES E. ROGAN
*Director of the United States Patent and Trademark Office*